(12) United States Patent
Ahmed

(10) Patent No.: US 7,814,042 B2
(45) Date of Patent: Oct. 12, 2010

(54) SELECTING CANDIDATE QUERIES

(75) Inventor: Rafi Ahmed, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1075 days.

(21) Appl. No.: 10/920,973

(22) Filed: Aug. 17, 2004

(65) Prior Publication Data

US 2006/0041537 A1 Feb. 23, 2006

(51) Int. Cl.
*G06F 17/30* (2006.01)
(52) U.S. Cl. .................. 707/2; 707/3; 707/4; 707/10
(58) Field of Classification Search .................. 707/2, 707/3, 4, 10
See application file for complete search history.

(56) References Cited

U.S. PATENT DOCUMENTS

| | | | |
|---|---|---|---|
| 4,769,772 A | 9/1988 | Dwyer | |
| 4,829,427 A | 5/1989 | Green | |
| 5,091,852 A | 2/1992 | Tsuchida et al. | |
| 5,325,525 A | 6/1994 | Shan et al. | |
| 5,339,429 A | 8/1994 | Tanaka et al. | |
| 5,412,804 A | 5/1995 | Krishna | |
| 5,437,032 A | 7/1995 | Wolf et al. | |
| 5,452,468 A | 9/1995 | Peterson | |
| 5,495,419 A | 2/1996 | Rostoker et al. | |
| 5,495,605 A | 2/1996 | Cadot | |
| 5,495,606 A | 2/1996 | Borden et al. | |
| 5,537,588 A | 7/1996 | Engelmann et al. | |
| 5,548,755 A | 8/1996 | Leung et al. | |
| 5,551,027 A | 8/1996 | Choy et al. | |
| 5,574,900 A | 11/1996 | Huang et al. | |
| 5,588,150 A | 12/1996 | Lin et al. | |
| 5,590,319 A | 12/1996 | Cohen et al. | |
| 5,590,324 A | 12/1996 | Leung et al. | |
| 5,642,515 A | 6/1997 | Jones et al. | |
| 5,675,791 A | 10/1997 | Bhide et al. | |
| 5,680,547 A | 10/1997 | Chang | |
| 5,710,915 A | 1/1998 | McElhiney | |
| 5,724,570 A | 3/1998 | Zeller et al. | |
| 5,787,251 A | 7/1998 | Hamilton et al. | |
| 5,797,136 A | 8/1998 | Boyer et al. | |

(Continued)

OTHER PUBLICATIONS

Ahmed, Rafi et al., "Cost-based Query Transformation in Oracle," VLDB 2006, Seoul, Korea, Copyright 2006 VLSB Endowment, ACM 1-59593-385, pp. 1026-1036.

(Continued)

*Primary Examiner*—Baoquoc N To
(74) *Attorney, Agent, or Firm*—Hickman Palermo Truong & Becker LLP

(57) ABSTRACT

In an example embodiment, multiple candidate selection techniques are made available to a query-processing unit for processing a query. A candidate selection technique is chosen from among the available candidate selection techniques for an incoming query. The candidate selection technique may be chosen based on a configuration file or user input or based on some aspect of the query, the user, or the database on which the query will run. A set of semantically equivalent queries (also called a set of candidate queries) is determined for an the incoming query based on the chosen candidate selection technique. A choice is then made among the candidate queries, usually based on a cost measure, as to which query to execute or store for later execution.

126 Claims, 6 Drawing Sheets

U.S. PATENT DOCUMENTS

| | | | |
|---|---|---|---|
| 5,822,748 | A | 10/1998 | Cohen et al. |
| 5,832,477 | A | 11/1998 | Bhargava et al. |
| 5,857,180 | A | 1/1999 | Hallmark et al. |
| 5,905,981 | A | 5/1999 | Lawler |
| 5,918,225 | A | 6/1999 | White |
| 5,924,088 | A | 7/1999 | Jakobsson et al. |
| 5,963,932 | A | 10/1999 | Jakobsson et al. |
| 5,963,959 | A | 10/1999 | Sun et al. |
| 5,974,408 | A | 10/1999 | Cohen et al. |
| 6,009,265 | A | 12/1999 | Huang et al. |
| 6,026,394 | A * | 2/2000 | Tsuchida et al. ............... 707/3 |
| 6,032,143 | A | 2/2000 | Leung et al. |
| 6,044,378 | A | 3/2000 | Gladney |
| 6,061,676 | A | 5/2000 | Srivastava et al. |
| 6,289,334 | B1 | 9/2001 | Reiner et al. |
| 6,298,342 | B1 * | 10/2001 | Graefe et al. .................. 707/4 |
| 6,339,768 | B1 | 1/2002 | Leung et al. |
| 6,370,524 | B1 | 4/2002 | Witkowski |
| 6,430,550 | B1 | 8/2002 | Leo et al. |
| 6,438,558 | B1 | 8/2002 | Stegelmann |
| 6,438,562 | B1 | 8/2002 | Gupta et al. |
| 6,510,422 | B1 | 1/2003 | Galindo-Legaria et al. |
| 6,529,896 | B1 | 3/2003 | Leung et al. |
| 6,529,901 | B1 * | 3/2003 | Chaudhuri et al. ............. 707/3 |
| 6,535,874 | B2 | 3/2003 | Purcell |
| 6,622,138 | B1 | 9/2003 | Bellamkonda et al. |
| 6,684,203 | B1 | 1/2004 | Waddington et al. |
| 6,694,306 | B1 * | 2/2004 | Nishizawa et al. ............. 707/3 |
| 6,792,420 | B2 | 9/2004 | Chen et al. |
| 6,801,905 | B2 | 10/2004 | Andrei |
| 6,901,405 | B1 | 5/2005 | McCrady et al. |
| 6,934,699 | B1 * | 8/2005 | Haas et al. ..................... 707/2 |
| 6,941,360 | B1 | 9/2005 | Srivastava et al. |
| 6,954,776 | B1 | 10/2005 | Cruanes et al. |
| 6,961,729 | B1 | 11/2005 | Toohey et al. |
| 6,980,988 | B1 | 12/2005 | Demers et al. |
| 6,990,503 | B1 | 1/2006 | Luo |
| 7,031,956 | B1 | 4/2006 | Lee et al. |
| 7,072,896 | B2 | 7/2006 | Lee et al. |
| 7,089,225 | B2 * | 8/2006 | Li et al. ......................... 707/2 |
| 7,111,020 | B1 | 9/2006 | Gupta et al. |
| 7,146,360 | B2 | 12/2006 | Allen et al. |
| 7,158,994 | B1 | 1/2007 | Smith et al. |
| 7,167,852 | B1 | 1/2007 | Ahmed et al. |
| 7,246,108 | B2 * | 7/2007 | Ahmed .......................... 707/2 |
| 7,440,935 | B2 * | 10/2008 | Day et al. ...................... 707/2 |
| 2001/0047372 | A1 | 11/2001 | Gorelik et al. |
| 2002/0038313 | A1 | 3/2002 | Klein et al. |
| 2002/0138376 | A1 | 9/2002 | Hinkle |
| 2003/0055814 | A1 | 3/2003 | Chen et al. |
| 2003/0120825 | A1 | 6/2003 | Avvari et al. |
| 2003/0120879 | A1 | 6/2003 | Chen et al. |
| 2003/0167258 | A1 | 9/2003 | Koo et al. |
| 2004/0068509 | A1 | 4/2004 | Garden et al. |
| 2004/0068696 | A1 | 4/2004 | Seyrat et al. |
| 2004/0143791 | A1 | 7/2004 | Ito et al. |
| 2004/0148278 | A1 | 7/2004 | Milo et al. |
| 2004/0167904 | A1 | 8/2004 | Wen et al. |
| 2004/0220911 | A1 | 11/2004 | Zuzarte et al. |
| 2004/0220923 | A1 * | 11/2004 | Nica ............................... 707/3 |
| 2004/0267760 | A1 | 12/2004 | Brundage et al. |
| 2004/0268305 | A1 | 12/2004 | Hogg et al. |
| 2005/0033730 | A1 | 2/2005 | Chaudhuri et al. |
| 2005/0055382 | A1 | 3/2005 | Ferrat et al. |
| 2005/0076018 | A1 | 4/2005 | Neidecker-Lutz |
| 2005/0149584 | A1 | 7/2005 | Bourbonnais et al. |
| 2005/0187917 | A1 | 8/2005 | Lawande et al. |
| 2005/0198013 | A1 | 8/2005 | Cunningham et al. |
| 2005/0210010 | A1 | 9/2005 | Larson |
| 2005/0234965 | A1 | 10/2005 | Rozenshtein et al. |
| 2005/0278289 | A1 | 12/2005 | Gauweiler et al. |
| 2005/0278616 | A1 | 12/2005 | Eller |
| 2005/0283471 | A1 | 12/2005 | Ahmed |
| 2005/0289125 | A1 | 12/2005 | Liu et al. |
| 2006/0026115 | A1 | 2/2006 | Ahmed |
| 2006/0026133 | A1 | 2/2006 | Ahmed |
| 2006/0041537 | A1 | 2/2006 | Ahmed |
| 2006/0167865 | A1 | 7/2006 | Andrei |
| 2006/0168513 | A1 | 7/2006 | Coulson et al. |
| 2007/0027880 | A1 | 2/2007 | Dettinger et al. |
| 2007/0044012 | A1 | 2/2007 | Suver et al. |
| 2007/0073643 | A1 | 3/2007 | Ghosh et al. |
| 2007/0179947 | A1 | 8/2007 | Ahmed et al. |
| 2007/0219951 | A1 | 9/2007 | Ahmed et al. |
| 2007/0219952 | A1 | 9/2007 | Ahmed et al. |
| 2007/0219969 | A1 | 9/2007 | Su et al. |
| 2007/0219977 | A1 | 9/2007 | Su et al. |
| 2008/0010240 | A1 | 1/2008 | Zait |
| 2008/0077606 | A1 | 3/2008 | Fang et al. |

OTHER PUBLICATIONS

George Lumpkin, Hakan Jakobsson, "Query Optimization in Oracle 9i", Oracle Corporation, Oracle White Paper, Feb. 2002, pp. 1-30.

Hamid Pirahesh, Joseph M. Hellerstein, Waqar Hasan, "Extensible/Rule Base Query Rewrite Optimization in Starburst", IBM Almaden Research Center, pp. 1-10.

Umeshwar Dayal, "Of Nests and Trees: A Unified Approach to Processing Queries That Contain Nested Subqueries, Aggregates and Quantifiers", Proceedings of the 13$^{th}$ VLDB Conference, Brighton 1987, pp. 197-208.

P. Griffiths Selinger, M.M. Astrahan, D.D. Chamberlin, R.A. Lorie, T.G. Price, "Access Path Selection in a Relational Database Management System", Proceedings of the 1979 ACM SIGMOD International Conference on the Management of Data, 1979, pp. 23-34.

U.S. Appl. No. 10/874,400, filed Jun. 22, 2004, Office Action mailed Nov. 30, 2006.

Chaudhuri, Surajit et al., "Including Group-By in Query Optimization," Proceedings of the 20$^{th}$ VLDB Conference—1994, pp. 354-366.

Galindo-Legaria, Cesar et al., "Outerjoin Simplification and Reordering for Query Optimization," ACM Transactions on Database Systems, vol. 22, No. 1, Mar. 1997, pp. 43-74.

Erickson, Gail et al., "Improving Performance with SQL Server 2000 Indexed Views," Microsoft TechNet, Sep. 2000, located on the internet at http://www.microsoft.com/technet/prodtechnol/sql/2000/maintain/indexvw.mspx?pf=true, retrieved on Nov. 11, 2006, 14 pages.

Mishra, Priti et al., "Join Processing in Relational Databases," ACM Computing Surveys, vol. 24, No. 1, Mar. 1992, pp. 63-113.

Muralikrishna, M., "Improved Unnesting Algorithms for Join Aggregate SQL Queries," Proceedings of the 18$^{th}$ VLDB Conference—1992, pp. 91-102.

Seshadri, Preveen, "Cost-Based Optimization for Magic: Algebra and Implementation," Sigmond '96, 1996 ACM 0-89791-794-4, pp. 435-446.

Ahmed, Rafi, et al., "Cost-Based Query Transformation in Oracle," Copyright 2006 VLDB, ACM 1595933859, pp. 1026-1036.

Oracle, "Oracle 9I Database Documentation", Oracle, Parts A96670-01, A96674-01, A96673-02, 2002, 833 pages.

Fitzgerald et al., "Special Edition Using Crystal Reports IO", Que, Chapters 23, 24, 27, 35, Appendix A, Jul. 14, 2004, 170 pages.

Rankins et al., "Microsoft SQL Server 2000 Unleashed," Second Edition, Sams, Chapters 3, 4, 5, 6, 36, Dec. 18, 2002, 109 pages.

Deutsch, Alin et al., "Minimization and Group-By Detection for Nested XQueries", University of California, San Diego, 2003, 15 pages.

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

Oracle, "Optimizer Modes, Plans Stability, and Hints", Oracle8i Tuning Release 8.1.5 A67775-01, Oracle Website, 1999, 54 pages.

Chen, et al., "View merging in the context of view selection changing", Database Engineering and Applications Symposium 2002, Proceedings, Jul. 2002, 10 pages.

Priti, Patil et al., "Holistic Schema Mappings for XML-on-RDBMS", Database systems for advanced applications, vol. 3882, Lecture notes in Computer Science, Springer-Verlag, Jan. 1, 2006, 16 pages.

Hammerschmidt, B C et al., "Autonomous Index Optimization in XML Databases", $21^{st}$ International Conference on Data Engineering, XP010924124, IEEE, Apr. 5, 2005, 10 pages.

European Patent Office, "International Search Report", PCT/US2008/052932, dated Jun. 13, 2008, 13 pages.

Claims, PCT/US2008/052932, 4 pages.

Leverenz et al., "Oracle 8i Concepts Release 8.1.5- A67781-01", Oracle Corporation, Feb. 1999, located on the internet at <http://www.csee.umbc.edu/help/oracle8/server.815/a67781/toc.htm>, 122 pages.

Stonebraker, Michael, et al., "The Design of XPRS," Proceedings of the 14th VLDB Conference, 1988, pp. 318-330.

Tandem, "A Benchmark of NonStop SQL on the Debit Credit Transaction", The Tandem Performance Group, 1988, pp. 337-341.

Bergsten, et al., "Prototyping DBS3 a Shared-Memory Parallel Database System", IEEE 818622954, 226-234, 1991, pp. 226-234.

Bhide, Anupam, "An Analysis of Three Transaction Processing Architectures", Computer Science Division, UC Berkeley, Proceeding of the 14th VLDB Conference, 1998, pp. 339-350.

Copeland, George et al., "Data Placement in Bubba," ACM 0897912683, 1988, pp. 99-108.

Dayal, Umeshwar, "Of Nests and Trees: A Unified Approach to Processing Queries that Contain Nested Subqueries, Aggregates and Quantifiers", Proceedings of the 13th VLDB Conference, Brighton 1987, pp. 197-208.

Dewitt, et al., "A Performance Analysis of the Gamma Database Machine," Computer Sciences Department, University of Wisconsin, 1988, pp. 350-360.

Englert, Susan et al., "A Benchmark of NonStop SQL Release 2 Demonstrating Near-Linear Speedup and Scaleup on Large Databases", Technical Report 89.4, Tandem Part No. 27469, May 1989, pp. 1-23.

Graefe, Goetz, "Encapsulation of Parallelism in the Volcano Query Processing System," Mar. 1990, pp. 102-111.

Hirano, et al., "Load Balancing Algorithm for Parallel Processing on Shared Memory Multiprocessor", IEEE, pp. 210-217, 1991.

Hong, et al., "Optimization of Parallel Query Execution Plans in XPRS", Proceedings of the First International Conference on Parallel and Distributed Information Systems, IEEE, 1991, pp. 218-225.

Li, C., et al., "Minimizing View Sets without Losing Query-Answering Power" 2001, Springer, pp. 99-113.

Mumick, I., et al., "Maintenance of Data Cubes and Summary Tables in a Warehouse", ACM 1997, pp. 100-111.

Ahmed, Rafi, "Affidavit of Rafi Ahmed", dated Feb. 8, 2010, 3 pgs.

Response to Office Action, U.S. Appl. No. 11/237,040, submitted Feb. 10, 2010, 20 pgs.

Kemp et al., "Improving Federated Database Queries Using Declarative Rewrite Rules for Quantified Subqueries", Journal of Intelligent Information Systems, Dec 2001. vol. 17, Iss. 2-3; p. 281. Download: http://proauest.umi.com/padlink?Ver=1&Fxo=04-11-.

Mistry, et al., "Materialized View Selection and Maintenance Using Multi-Query Optimization," IIT-Bombay Bell Labs Univ. of Massachusetts-Amherst (Jun. 2001).

\* cited by examiner

SELECTING CANDIDATE QUERIES

RELATED APPLICATIONS

This application is related to U.S. patent application Ser. No. 10/874,400, entitled "Multi-tier Query Processing", filed by Rafi Ahmed on Jun. 22, 2004, the contents of which are herein incorporated by reference for all purposes as if originally set forth herein, referred to herein as to '2465.

This application is related to U.S. patent application Ser. No. 10/900,788, entitled "Determining Query Cost Based on a Subquery Filtering Factor", filed by Rafi Ahmed on Jul. 27, 2004, which issued as U.S. Pat. No. 7,233,944 on Jun. 19, 2007, the contents of which are herein incorporated by reference for all purposes as if originally set forth herein, referred to herein as to '2466.

This application is related to U.S. patent application Ser. No. 10/901,272, entitled "Reusing Optimized Query Blocks in Query Processing", filed by Rafi Ahmed on Jul. 27, 2004, which issued as U.S. Pat. No. 7,246,108 on Jul. 17, 2007, the contents of which are herein incorporated by reference for all purposes as if originally set forth herein, referred to herein as to '2467.

FIELD OF THE INVENTION

The present invention relates to query processing. The invention more specifically relates to selecting candidate queries.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Relational database management systems store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries.

A user retrieves information from and submits updates to a database by interacting with a database application. The user's actions are converted into a query by the database application. The database application submits the query to a database server. The database server responds to the query by accessing the tables specified in the query to determine which information stored in the tables satisfies the queries. The information that satisfies the queries is retrieved by the database server and transmitted to the database application. Alternatively, a user may request information directly from the database server by constructing and submitting a query directly to the database server using a command line or graphical interface.

Queries submitted to the database server must conform to the rules of a particular query language. One popular query language, known as the Structured Query Language (SQL), provides users a variety of ways to specify information to be retrieved. In SQL and other query languages, queries may include inner query blocks. For example, the query

```
SELECT T1.x
FROM table1 T1, parts P
WHERE P.y = T1.y AND P.z = 'MED BOX'
    AND T1.quantity < (SELECT AVG (T2.quantity)
        FROM Table2 T2
        WHERE T2.partkey = P.partkey)
    AND P.quantity < (SELECT AVG (T3.quantity)
        FROM Table3 T3
        WHERE T3.serialnum = T1.serialnum);
``` has one outer query block and two inner query blocks, and each inner query block is a subquery:

SELECT AVG (T2.quantity) FROM Table2 T2 WHERE T2.partkey=P.partkey and

SELECT AVG (T3.quantity) FROM Table3 T3 WHERE T3.serialnum=T1.serialnum.

In one approach to processing queries, the original queries are executed or stored for later execution. A problem with this approach is that there may be more efficient ways of determining the results than executing the query as it was received.

In a second approach, a received query is transformed based on heuristics. The transformed version of the query is then executed in place of the original query. Since the transformed query is semantically equivalent to the original query, the same results are produced. However, since the transformed query typically has a lower cost than the original query, the same results are obtained with less computational cost than would have been incurred if the original query were executed. A problem with this approach, however, is that, even though a semantically equivalent query with a lower-cost than the original query may have been produced via the transformations, there still may be more efficient ways of determining the results than executing the transformed query.

Based on the discussion above, there is clearly a need for techniques that overcome the shortfalls of previous approaches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
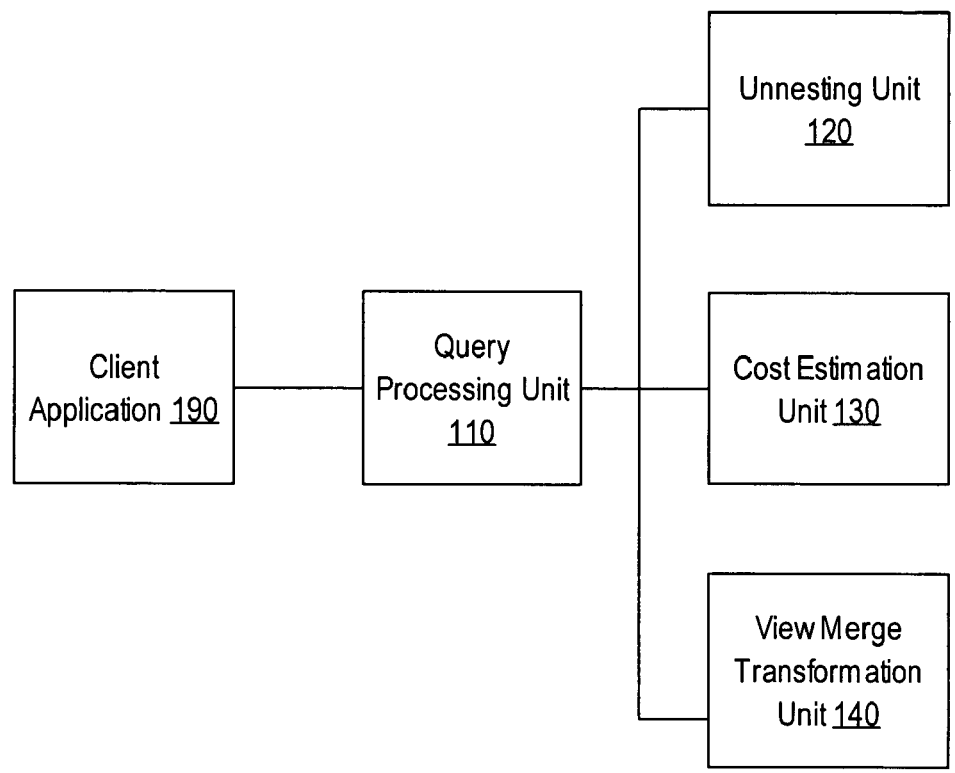
FIG. 1 is a block diagram that depicts a system for selecting candidate queries.

Techniques for selecting candidate queries are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

Herein are described techniques for selecting candidate queries. In general, the techniques may include determining the costs for multiple semantically equivalent queries. In some cases, the semantically equivalent queries each may comprise copies of the same query blocks and each of the inner query blocks may be in one of one or more states. Examples of inner query blocks in a query include subqueries and views. An example of an inner query block in a particular state is a subquery being in an "unnested" state. Depending on implementation, subquery query blocks may be in one of three states: nested, unnested, and if the unnested subquery includes an inline mergeable view, then having the view merged. Depending on implementation, view query blocks may be in a state of being either unmerged or merged. The state of an inner query block may also be determined by pushing predicates. For example, a predicate may be pushed into a view. Examples of and techniques for predicate manipulation are described in the section entitled Predicate Manipulation. In general, the techniques described herein are not limited to any particular type of query block or any particular set of states for any particular type of query block.

In the techniques described herein, a set of semantically equivalent queries, herein called the set of candidate queries, is determined for an incoming query based on a particular candidate selection technique. A choice is then made among the candidate queries, usually based on a cost measure, as to which query to execute or store for later execution. In one embodiment, there are multiple, available candidate selection techniques and before the set of candidate queries is determined, a choice of candidate selection techniques is made. The choice of candidate selection techniques may be made based on a configuration file or user input or based on some aspect of the query, the user, or the database on which the query will run.

In one embodiment, a deep memory copying technique is used in determining the semantically equivalent queries. In the embodiment, the outer query is copied multiple times for generating each semantically equivalent query. Therefore, each semantically equivalent query has its own copy, in memory, of the query blocks being optimized. Each semantically equivalent query includes directives regarding each inner query block; that is, for example, an indicator of whether a particular inner query block will be unnested or not and whether a particular view will be merged or not.

Candidate Selection Techniques

The three general categories for the candidate selection techniques described herein are exhaustive, linear, and iterative. In the exhaustive selection technique, the set of candidate queries comprise all semantically equivalent queries that can be generated by a query processing unit. If in the original query there are N inner query blocks on which a transformation T can apply, then the computation cost of exhaustive selection technique may be of O(2**N). The candidate queries are selected for cost determination. Costs are determined for each of the semantically equivalent queries generated, and, thereby, the semantically equivalent query with the overall lowest cost may be selected for storage and/or execution.

For large number of inner query blocks, the computation of costs in the exhaustive technique may be prohibitively expensive.

In the linear selection and iterative candidate selection techniques, fewer than all of the possible semantically equivalent queries are selected for cost determination. In the "linear selection" technique, a starting query is determined based on the original query. All inner query blocks of the starting query may be manipulated to be in the same transformation state. The starting query is established as the current-best query. Each candidate query is determined based on the current-best query and an alternative state for a particular inner query block in the current-best query. If a cost associated with a candidate query is better than the cost for the current-best query, then the candidate query is established as the current-best query; otherwise, the current-based query remains unchanged. The next candidate query is determined based on the current-best query and a different alternative state for the same inner query block or an alternative state for a different inner query block in the current-best query. After all of inner query blocks have been processed, the resulting "current-best" query is established as the query that will be used to generate results for the original query. If in the original query there are N inner query blocks on which a transformation T can apply, the computation cost of linear selection technique may be of O (N).

In the "iterative selection" technique, for each "set of iterations" of the iterative selection, a starting query is established based on the original query, along with a determination of which particular inner query blocks will be manipulated (i.e., transformed) in the current set of iterations. Each set of iterations manipulates a particular set of inner query blocks, which are chosen based on some criteria, such as cost of the inner query blocks. Each set of iterations is similar to the linear selection technique, except that only the particular set of inner query blocks are manipulated in candidate queries. That is, candidate queries are determined based on the local-best query for that iteration (initially established as the starting query for the iteration) with each of the inner query blocks in the particular set of inner query blocks transformed in turn. If the semantically equivalent query (i.e., the local-best query with the currently-manipulated set of inner query block transformed) has a lower cost than the local-best query, then the local-best query is reestablished as the semantically equivalent query for the particular iteration.

A set of iterations is performed for each starting query. Each starting query is determined based on the original query and a different set of inner query blocks (i.e., a different combination of particular inner query blocks to be manipulated). Finally, a particular semantically equivalent query is chosen as the lowest cost candidate query from among the set of equivalent queries that resulted from the sets of iterations. In order to control the total cost of performing the iterative selection, a count of the number of candidate queries considered may be kept; and the process may be terminated after a predetermined number of semantically equivalent candidate queries have been considered.

Estimating Query Cost

There are numerous methods for estimating the cost of a query. The techniques described herein are in no way limited to any particular type or types of estimation methods. Example techniques for estimating query costs are described in (1) "Access Path Selection in a Relational Database Management System" P. G. Selinger, et al., ACM SIGMOD, 1979; (2) "Database System Implementation", H. Garcia-Molina, et al., Prentice Hall, 2000; and (3) "Query Evaluation Techniques for Large Databases", G. Graefe, ACM Computing Surveys, 1993. Other methods for estimating the cost of queries are described in '2465, '2466, and '2467.

Subquery Unnesting Transformation

Subquery unnesting may include determining a semantically equivalent version of a query in which the filtering of data produced by one or more subqueries within the query is effectively produced by introducing additional SQL join terms in the outer query. Generally, unnesting involves transformation in which (1) the subquery block is merged into the containing query block of the subquery or (2) the subquery is converted into an inline view. For example, some SQL IN or SQL ANY subqueries may be unnested by converting the subquery into an inline DISTINCT view or into an inline GROUP BY view. For a specific example, in the query listed in the section entitled Background, unnesting the subquery may result in:

```
SELECT L1.1_extendedprice
FROM lineitem L1, parts P,
  (SELECT AVG(L2.1_quantity) AS LAVG, L2.1_partkey AS
  L_PKEY
  FROM lineitem L2
  GROUP BY L2.1_partkey) V
WHERE P.p_partkey = L1.1_partkey AND P.p_container =
'MED BOX'
  AND P.p_partkey = V.L_PKEY AND and L1.1_quantity < V.LAVG;
```

The techniques described herein are in no way limited to any particular type or types of unnesting methods. Various embodiments of unnesting techniques are given in (1) "Of Nests and Trees: A Unified Approach to Processing Queries that Contain Nested Subqueries, Aggregates and Quantifiers", U. Dayal, 13th VLDB Conf. 1987; and (2) "Extensible/Rule Based Query Rewrite Optimization in Starburst", Pirahesh, et al., ACM SIGMOD, 1992.

View Merge Transformation

For queries that have had subqueries unnested, the unnesting process may result in the generation of a new inline view in the query. Depending on the technique or techniques used to unnest a subquery, it may produce a semi-joined, anti-joined or regular-joined inline views in the outer query. The original query may also reference inline or predefined views. These views in a query may be mergeable. In various embodiments, mergeable views may include those views that contain an aggregation function (e.g., MAX, MIN, COUNT, AVG, SUM), and, in the context of SQL, a SQL DISTINCT keyword, or a SQL GROUP BY clause. Other views may also be mergeable. The techniques described herein are in no way limited to any particular type or types of view merging. Example embodiments of view merging are given in (1) "Of Nests and Trees: A Unified Approach to Processing Queries that Contain Nested Subqueries, Aggregates and Quantifiers", U. Dayal, 13th VLDB Conf. 1987; and (2) "Extensible/Rule Based Query Rewrite Optimization in Starburst", Pirahesh, et al., ACM SIGMOD, 1992.

An example of merging a view, in the context of the example given above, is

```
SELECT L1.1_extendedprice
FROM lineitem L1, parts P, lineitem L2
WHERE L1.1_partkey = P.p_partkey AND
  P.p_container = 'MED BOX'
```

```
  AND L2.1_partkey = P.p_partkey
  GROUP BY L2.1_partkey, L1.1_quantity, L1.rowid, P.rowid,
  L1.1_extendedprice HAVING L1.1_quantity < AVG
  (L2.1_quantity);
```

Predicate Manipulation

There are numerous types of predicate manipulation that may be performed on a query. The techniques described herein are in no way limited to any particular type or types of predicate manipulation. The example given here is for illustrative purposes only.

Predicates that are in a query may be "pushed" into one or more inner query blocks in the query. "Pushing" may be performed when a predicate in the outer query is independent of all other terms in the outer query. For example, consider the query:

```
SELECT View1.empno, View1.ename
  FROM ( SELECT empno, ename, job, mgr, hiredate, sal, comm, deptno
    FROM emp1
  UNION
  SELECT empno, ename, job, mgr, hiredate, sal, comm, deptno
    FROM emp2) View1
  WHERE View1.deptno = 20;
```

The predicate "View1.deptno=20" can be pushed into view "View1", resulting in the command:

```
SELECT empno, ename
  FROM ( SELECT empno, ename, job, mgr, hiredate, sal, comm, deptno
    FROM emp1
    WHERE deptno = 20
  UNION
  SELECT empno, ename, job, mgr, hiredate, sal, comm, deptno
    FROM emp2
    WHERE deptno = 20 ) View1;
```

Other examples of predicate manipulation are given in J. Hellerstein, "Practical Predicate Placement", ACM SIGMOD, 1994.

Structural Overview

FIG. 1 is a block diagram that depicts a system for selecting candidate queries.

FIG. 1 depicts five logical machines: a query processing unit 110, an unnesting unit 120, a cost estimation unit 130, a view merge transformation unit 140, and a client application 190. Each logical machine may run on separate physical computing machines or may be running on the same physical computing machine as one or more of the other logical machines. Various embodiments of computers and other physical and logical machines are described in detail below in the section entitled Hardware Overview.

The query processing unit 110 is communicatively coupled to the unnesting unit 120, the cost estimation unit 130, the view merge transformation unit 140, and the client application 190. In various embodiments, each of the unnesting unit 120, cost estimation unit 130, and the view merge transformation unit 140 may also each be communicatively coupled to one or more of each of the other units 120, 130, and 150. In various embodiments, coupling is accomplished by optical, infrared, or radio signal transmission, direct cabling, wireless networking, local area networks (LANs), wide area networks (WANs), wireless local area networks (WLANs), the Internet, or any appropriate communication mechanism.

In the example herein, the unnesting unit 120 provides, for a particular query that contains a subquery, an output query with the subquery unnested. The cost estimation unit 130 estimates the time or central processing unit (CPU) costs for an input query. The view merge transformation unit 140 takes as input a query with a mergeable view and merges the view to produce an output query. The query processing unit 110 may use the unnesting unit 120, the cost estimation unit 130, or the view merge transformation unit 140 to process queries that have one or more subqueries.

In one embodiment, each of the query processing unit 110, the unnesting unit 120, the cost estimation unit 130, and the view merge transformation unit 140 runs as part of a database server. The database may be a single node or multiple node database server and may be an object-oriented database server, a relational database server, or any other structured data server.

The client application 190 may be a client program communicatively coupled to a database server comprising the query processing unit 110, the unnesting unit 120, the cost estimation unit 130, and the view merge transformation unit 140, or may be coupled directly to the query processing unit 110. In one embodiment, the client application 190 is a database application. The client application 190 may include machine executable instructions which, when executed by one or more processors, cause the application to transmit one or more queries to or receive results from the query processing unit 110.

Exhaustive Candidate Selection

Figure 2:
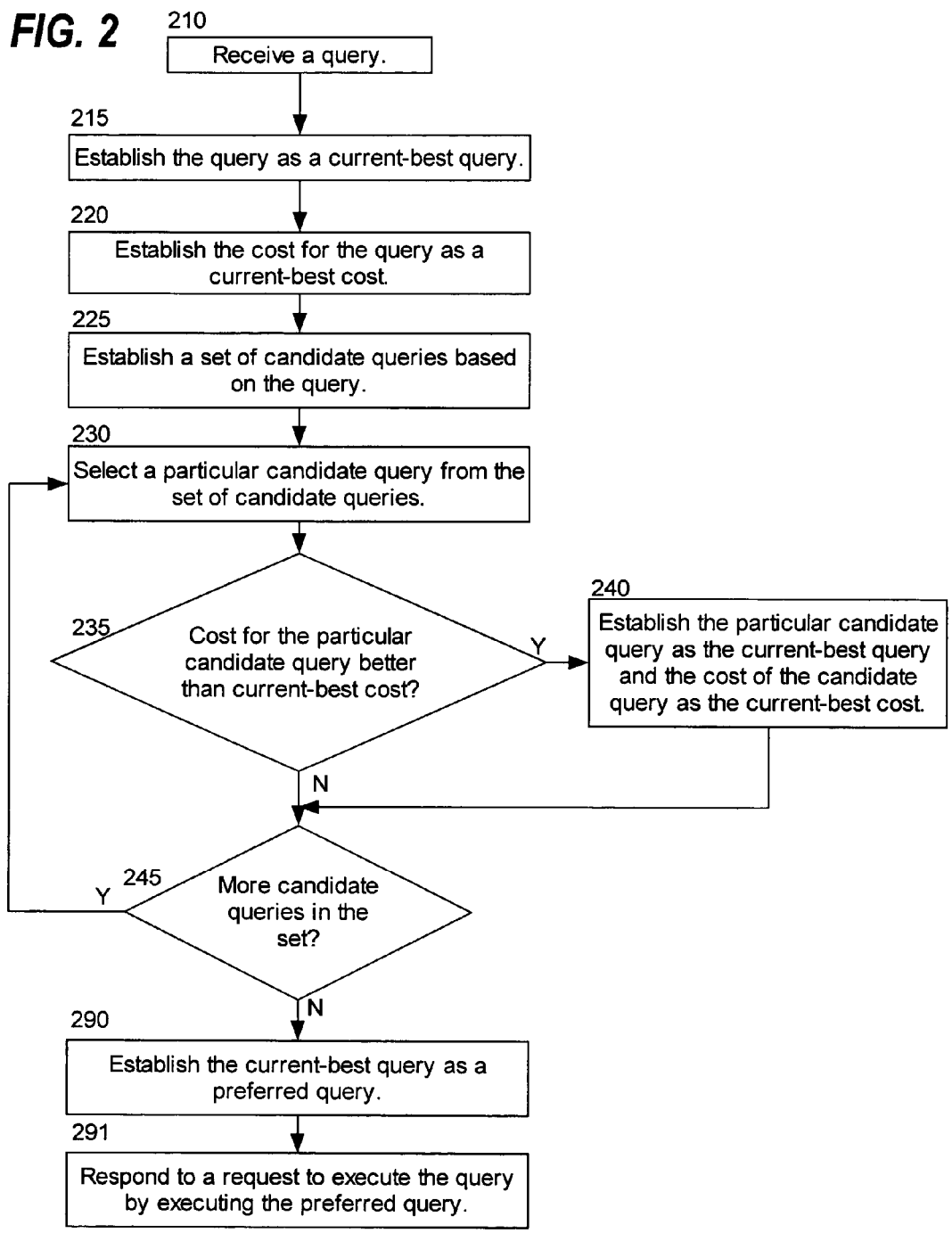
FIG. 2 is a block diagram that depicts a technique for selecting candidate queries using an exhaustive candidate selection technique.

FIG. 2 is a block diagram that depicts a technique for selecting candidate queries using an exhaustive candidate selection technique.

In step 210, a query is received. The query may be received from any appropriate source, including a database application, or a client application 190. The form of the query, as it is first received, is referred to herein as the "original query."

In step 215, the original query is established as a "current-best" query. Establishing the original query as the current-best query may include storing an indication, in a machine-readable medium, that the current-best query is the original query. Such an indication in a machine-readable medium may be a pointer, for the current-best query, stored in a variable in the memory of the query processing unit 110.

In step 220, the cost for the original query is established as the "current-best" cost. The cost for the original query may have already been determined and stored in a machine-readable medium at the query processing unit 110. If the cost has already been determined, step 220 may include storing the cost in a current-best cost variable in memory accessible to the query processing unit 110. If the cost for the original query is not yet know, then the cost may be determined by the cost estimation unit 130 and then stored in a current-best cost variable in memory accessible to the query processing unit 110.

In step 225, a set of candidate queries is established based on the original query. The set of candidate queries may be the set of all semantically equivalent queries that the query processing unit 110 is capable of producing. Alternatively, the set of candidate queries may include representative semantically equivalent queries from among all types of semantically equivalent queries the query processing unit 110 is capable of producing. For example, if the original query has a single inner query block that is a mergeable view, then, depending on implementation, the set of all candidate queries may include only the original query and a semantically equivalent query where the mergeable view is merged into the query. Examples of merging views are described in the section entitled View Merge Transformations. If the original query has two or more inner query blocks, then the set of candidate queries may include semantically equivalent queries that represent all combinations of alternative states for the query blocks. For example, if (1) the original query has two inner query blocks, a mergeable view and a subquery, and (2) the subquery, when unnested, results in the inclusion of a mergeable view in the semantically equivalent query, then the set of candidate queries may include six semantically equivalent queries as illustrated in the table below, where "Nested" subquery and "Unmerged" view blocks are those in their original state within the query, "Unnested" subqueries have been unnested into the outer query, "Unnested and Merged" subqueries have been unnested into the outer query and the unnesting resulted in a mergeable view, which was subsequently merged; and "Merged" views have been merged into the outer query:

| Query Number | State of mergeable view | State of subquery |
| --- | --- | --- |
| 1 | Unmerged | Nested |
| 2 | Unmerged | Unnested |
| 3 | Unmerged | Unnested and Merged |
| 4 | Merged | Nested |
| 5 | Merged | Unnested |
| 6 | Merged | Unnested and Merged |

In general, the number and type of queries that are included in the set of candidate queries will depend on implementation and available transformation techniques. The techniques described herein are in no way limited to a particular type or types of transformations. Examples of inner query block transformations, including subquery unnesting, view merging, and predicate manipulation, are given in the sections entitled Subquery Unnesting, View Merge Transformation, and Predicate Manipulation In step 230, a particular candidate query is selected for processing from the set of candidate queries. Any appropriate selection process may be used. For example, if each candidate query in the set of candidate queries is assigned a number, then the lowest numbered query that has not already been processed may be selected in step 230.

In step 235, a cost is determined for the particular candidate query. Examples of determining costs for queries are described in the section entitled Estimating Query Cost. In some cost determination techniques, partial costs for portions of a given query are determined as part of the process of determining the cost for the given query. Examples of determining partial costs for queries are given in '2466. In general, these partial costs are lower than the total cost for the given query; and the cost for the given query may be determined based on the partial cost. In one embodiment of the techniques described herein, the partial cost is compared to the current-best cost. If the partial cost is worse than the current-best cost, then the candidate query is rejected as being more expensive than the current-best query and step 245 is performed. Comparing partial costs to current-best costs to aid in candidate elimination may be beneficial, as such an approach may save time and reduce the central processing unit (CPU) cost of the technique.

If the cost for the particular candidate query is better than the current-best cost, then in step 240, the particular candidate query is established as the new current-best query, and the particular candidate query's cost is established as the new current-best cost. Establishing the current-best query and the current-best cost are described above with respect to steps 215 and 220.

If it is determined that the particular candidate query does not have a better cost than the current-best query (step 235) or after the particular candidate query has been established as the current-best query, then in step 245 a check is performed to determine whether there are more candidate queries to process from the set of candidate queries. The check may be performed, for example, by comparing the total number of queries in the set of candidate queries to the number of queries that have already been processed in steps 210-240.

If there are any unprocessed queries in the set of candidate queries, then step 230 is performed. If there are no more unprocessed queries in the set of candidate queries, then step 290 is performed.

In step 290, the current-best query is established as a preferred query. The preferred query may be stored for later execution; may be executed immediately; or both. At the execution of step 290, the current-best query has the best cost among the set of candidate queries. Additionally, the current-best query is semantically equivalent to the original query. Therefore, executing the current-best query would produce the same results as the original query and will do so for a cost that is as good or better than the cost of executing the original query. As a result, it may be beneficial to execute the preferred query in place of the original query. If the original query may be executed two or more times, then it may be useful to store the preferred query for later executions (since it may not be necessary to reestablish the preferred query for the original query).

In step 291, a request to execute the query is handled by executing the preferred query. Executing the preferred query produces the same results as executing the original query and does so with, at most, as much cost as executing the original query. The query processing unit 110 or any other appropriate process may receive a request to execute the query. In order to handle the request to execute the query, steps 210-290 may be performed to determine the preferred query. If the preferred query has already been determined, then the preferred query may be retrieved from a machine-readable medium. Regardless of how the preferred query is established or retrieved, the preferred query is executed in place of the original query and the results of executing the preferred query are provided to the entity that requested results for the query.

In the embodiments described with respect to FIG. 2, particular steps were described and an order of execution of those steps was given. The techniques described herein are in no way limited to those particular steps or the order of the steps described. For example, step 225 may be performed before steps 215 and 220. As another example, in some embodiments, step 225 may be performed as part of step 230, thereby only creating the set of candidate queries as they are used. As a third example, in various embodiments, step 290 is not performed and responding to a request to execute the original query is handled by executing the current-best query.

Linear Candidate Selection

Figure 3:
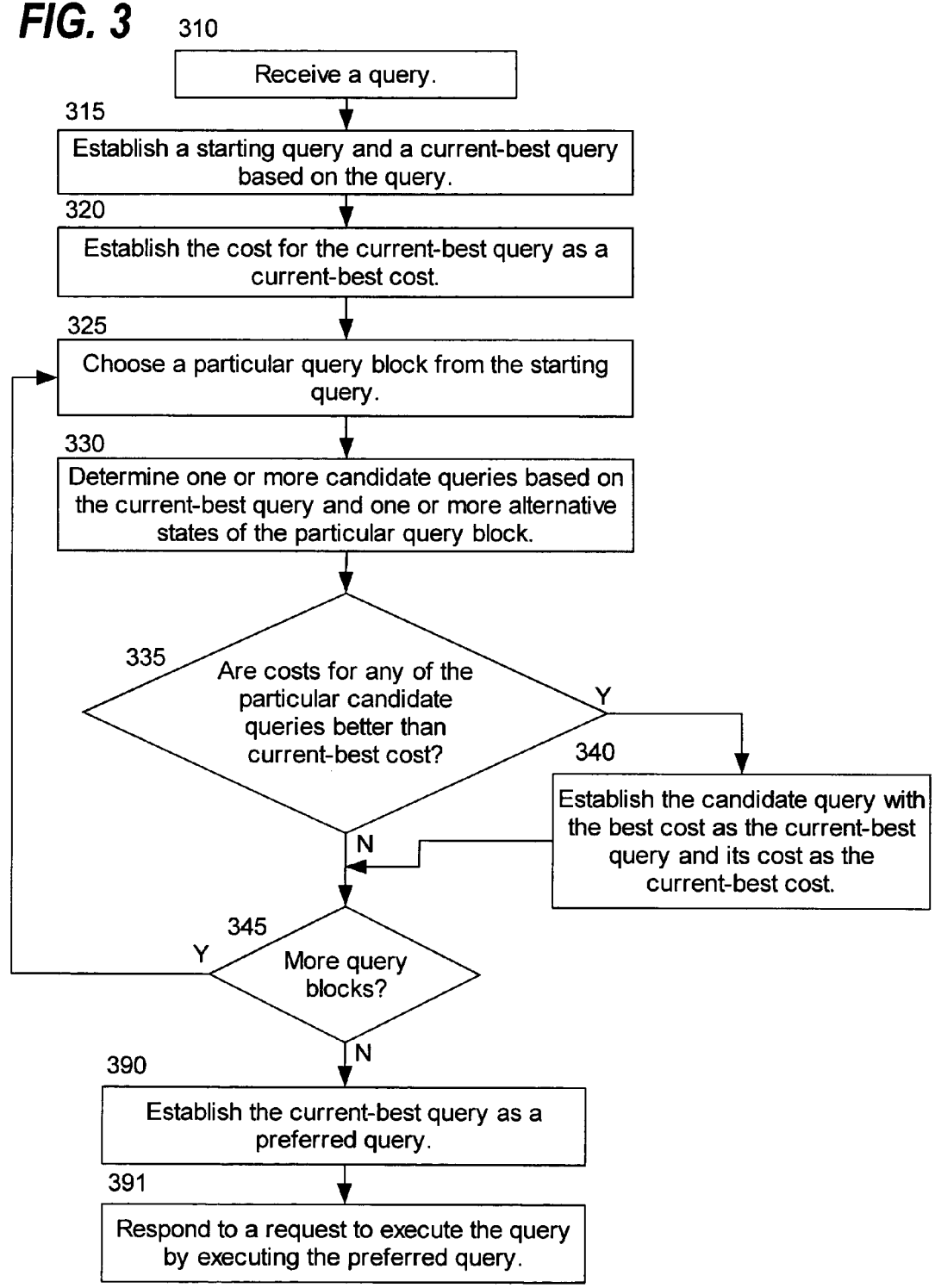
FIG. 3 is a block diagram that depicts a technique for selecting candidate queries using a linear candidate selection technique.

FIG. 3 is a block diagram that depicts a technique for selecting candidate queries using a linear candidate selection technique.

In step 310, a query is received. Receiving a query is described above with respect to step 210.

In step 315, a starting query and a current-best query are established based on the original query. In general, the current-best query and the starting query will typically be identical or substantially identical queries. The current-best query and the starting query may be established as the original query itself or may be determined based on the original query and one or more transformations. For example, if the original query has two inner query blocks that are both subqueries, then the current-best query and the starting query may be determined based on the original query and performing an unnesting operation on each of the two subqueries. In some embodiments, it may be beneficial to determine the current-best query and the starting query based on performing transformations for each of the inner query blocks in the original query. Doing so may be beneficial since other information may be obtained about the query blocks during the transformation process, such as a subquery filtering factor for each inner query block. '2466 describes techniques for determining and uses for the subquery filtering factor.

In step 320, the query processing unit 10 establishes the current-best cost as the cost for the current-best query. Example embodiments for determining costs are described above with respect to step 220 and in the section entitled Estimating Query Cost.

In step 325, the query processing unit 110 chooses a particular inner query block of the current-best query. The techniques described herein are in no way limited to a particular choice of an inner query block. As an example, the query processing unit 110 may choose the first inner query block in the original query the first time step 325 is executed and choose subsequent inner query blocks each subsequent time step 325 is executed.

In step 330, the query processing unit 10 determines one or more candidate queries based on the current-best query and one or more alternative states of the particular inner query block chosen in step 325. If there are two or more alternative states for the particular inner query block, then two or more candidate queries may be generated—one for each alternative state. For example, if the starting query has a nested subquery and the nested subquery is the chosen inner query block in step 325, then it may be possible that the subquery has two alternative states: unnested, and, if the unnesting process results in a mergeable view being added to the query, then also the state of having the subquery unnested and the view merged.

In step 335, the query processing unit 110 determines whether any of the candidate queries has a better cost than the current-best cost. The query processing unit 110 may determine the costs for each of the candidate queries as part of step 330. Alternatively, if the costs for the candidate queries are already know, then the costs may be retrieved. Examples of determining costs are described with respect to step 210 and in the section entitled Estimating Query Cost.

If the costs of any of the candidate queries are better than the current-best cost, then in step 340, the candidate query with the best cost is established as the new current-best query and the cost of that query is established as the new current-best cost. Establishing a query as a current-best query and establishing a cost as the current-best cost are described with respect to step 215. If none of the candidate queries has a better cost than the current-best cost (step 335), then the current-best query remains the same.

If none of the candidate queries has a better cost than the current-best cost (step 335) or if one of the candidate queries is newly established as the current-best query (step 340), then the query processing unit 110 performs a check to determine whether there are more inner query blocks which have not yet been processed in the current-best query (step 345). If there are more inner query blocks in the current-best query to process, then step 325 is performed.

If there are no more inner query blocks in the current-best query to be processed (step 345), then the current-best query is established as a preferred query in step 390. Establishing the current-best query as the preferred query is described above with respect to step 290.

In step 391, a request to execute the original query is handled by executing the preferred query. Example embodiments of handling a request to execute the original query by executing the preferred query are described above with respect to step 291.

The techniques described with respect to FIG. 3 are described as including particular steps and a particular sequence of steps. The techniques described herein are in no way limited to those particular steps or to that particular sequence of steps. For example, step 390 may not be performed and, in step 391, the query processing unit 110 responds to a request to execute the original query by executing the current-best query.

Iterative Candidate Selection

Figure 4:
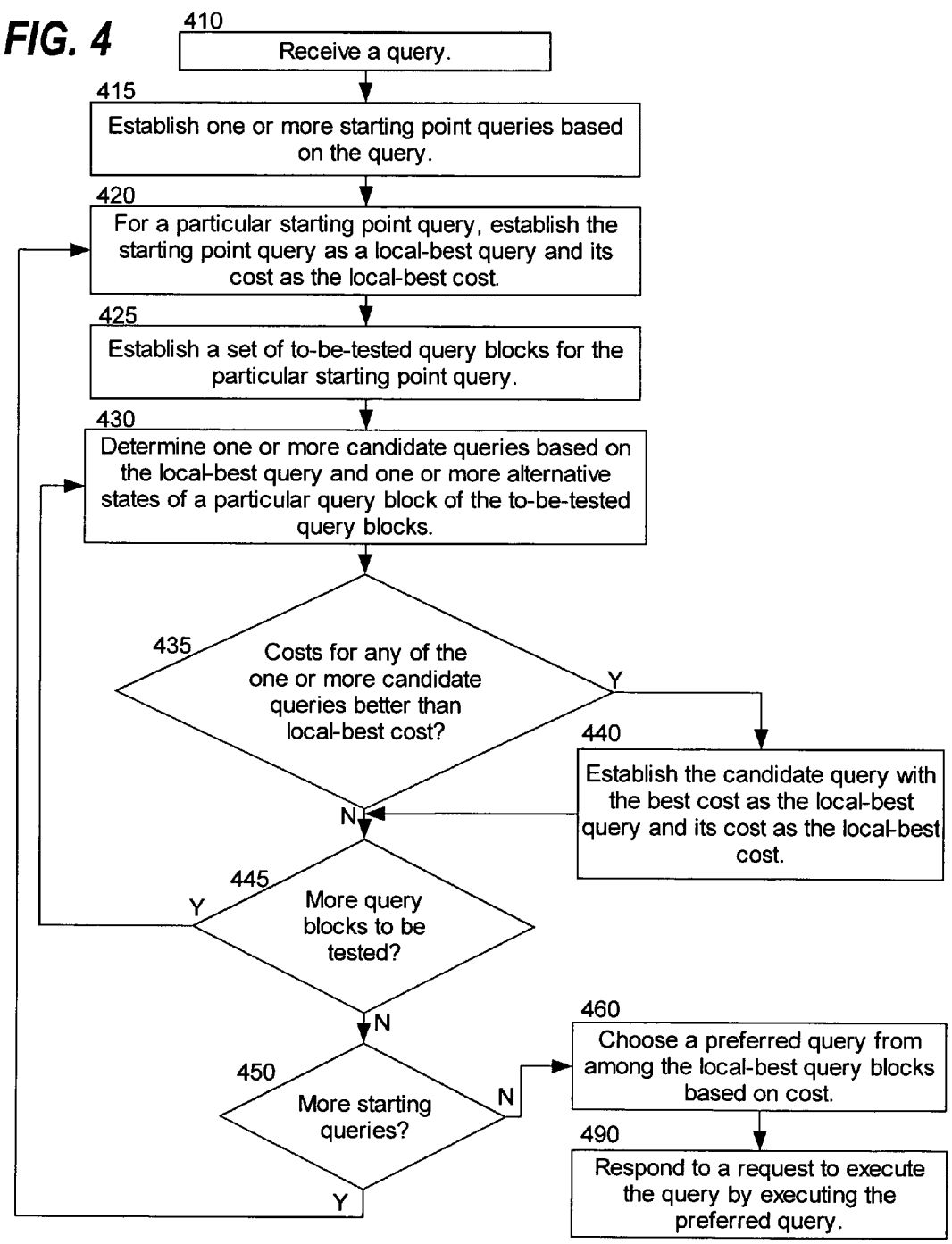
FIG. 4 is a block diagram that depicts a technique for selecting candidate queries using an iterative candidate selection technique.

FIG. 4 is a block diagram that depicts a technique for selecting candidate queries using an iterative candidate selection technique.

In step 410, the query processing unit 110 receives a query. Various embodiments of receiving a query are described above with respect to step 210.

In step 415, the query processing unit 110 establishes one or more starting queries based on the original query. The starting queries may be determined based on any appropriate rule or heuristic. For example, if the original query has two inner query blocks, each of which is a subquery, then four example starting queries may include queries in which (1) both subqueries are nested, (2) the first subquery is unnested and the second subquery is nested, (3) the first subquery is nested and the second subquery is unnested, and (4), both subqueries are unnested. In one embodiment, each starting query is established by (1) establishing a set of j to-be-manipulated (i.e., transformed) inner query blocks for which a particular transformation, Ti, applies and (2) generating the starting query based on the original query and applying transformation Ti to all j inner query blocks. Multiple starting queries could then be established, one for each of M transformations, Ti, where i=1 . . . M and j=1 . . . N, where N is the number of inner query blocks on which the transformation Ti applies.

Step 410, 415, or any other appropriate step may include determining the cost for the original query. Determining the cost of the original query may be beneficial since, as part of determining the cost of the original query, costs for the query blocks in the query may also be determined.

In step 420, a particular starting query (as established in step 415) is established as the local-best query and its cost is established as the local-best cost. Each set of iterations has associated with it a starting query, a local-best query, and a local-best cost. The cost for the local-best query may be determined using techniques such as those described in the section entitled Estimating Query Cost. Alternatively, if the cost for the particular starting query has already been determined and stored in a machine-readable medium, then the machine-readable medium may be accessed in order to determine the cost of the local-best query.

In step 425, the query processing unit 110 establishes a set of to-be-transformed inner query blocks for the particular starting query. As part of determining the set of to-be-transformed inner query blocks, the query processing unit 110 may determine a centroid query block and the number ("Q") of inner query blocks around the centroid inner query block that will be manipulated in the current iteration of steps 430-445. The centroid inner query block may be any inner query block in the starting query. The number Q of inner query blocks to be transformed and the choice of centroid query block may be determined by any appropriate means. For example, if the particular starting query has seven (i.e., N=7) inner query blocks, the centroid query block is chosen as the fourth inner query block, and the number Q of inner query blocks to be transformed is two, then, in the current iteration of steps 430-445, inner query blocks two, three, five, and six will be transformed. The centroid (fourth) query block may also be transformed. In other embodiments, any set of Q inner query blocks may be chosen as the to-be-transformed inner query blocks. For example, the Q to-be-transformed inner query blocks may be chosen as those inner query blocks for which a particular transformation, T1, may be applied.

In step 430, one or more candidate queries are determined based on the local-best query and one or more alternative states for a particular inner query block of the to-be-transformed inner query blocks. Alternatively, step 430 may include determining one or more candidate queries based on the local-best query and alternative states for one or more inner query blocks of the to-be-transformed inner query blocks. In various embodiments, the choice of order in which to manipulate each of the to-be-transformed inner query blocks may be based on costs for the inner query blocks. For example, the lowest cost inner query block(s) may be manipulated first. Other examples of determining one or more candidate queries based on a local-best query and one or more alternative states of a particular inner query block are described above with respect to step 330.

In step 435, the query processing unit 110 determines whether the costs for any of the one or more candidate queries is better than the local-best cost. Example embodiments of determining whether the costs for any of the one or more candidate queries is better than the local-best cost are described above with respect to step 335.

If the costs of any of the candidate queries are better than the current-best cost, then in step 440, the candidate query with the best cost is established as the new local-best query and the cost of that query is established as the new local-best cost. If none of the candidate queries has a better cost than the local-best cost (step 435), the local-best query remains the same. Establishing a query as a local-best query and establishing a cost as the local-best cost are described with respect to establishing a query as a current-best query and a cost as a current-best cost in step 215.

If none of the candidate queries has a better cost than the local-best cost (step 435) or if one of the candidate queries is established as the local-best query (step 440), then the query processing unit 110 performs a check to determine whether there are more to-be-transformed inner query blocks which have not yet been processed in the local-best query (step 445). If there are more inner query blocks in the local-best query to be processed, then step 430 is performed.

In one embodiment, the query processing unit 110 may, as part of step 445, check the number of candidate queries that have been processed. If more than a predefined number of candidate queries have been processed, then step 460 may be performed. Discontinuing the processing of candidate queries based on the number of candidate queries that have been processed may be beneficial as it provides a technique for limiting the number of iterations that are performed as part of the techniques described herein.

If there are no more inner query blocks in the local-best query to be processed (step 445), then the query processing unit 110 may perform a check to determine if the local-best cost is better than a global-best cost, then the local-best query is established as the new global-best query and the cost of that local-best query is established as the new global-best cost. If local-best cost is not better than the global-best cost, the global-best query remains the same. Establishing a query as a global-best query and establishing a cost as the global-best cost are described with respect to establishing a query as a current-best query and a cost as a current-best cost in step 240 and 340.

If there are no more inner query blocks in the local-best query to be processed (step 445), then the query processing unit 110 performs a check to determine whether there are more starting queries to be processed in step 450. The query processing unit 110 may determine whether there are more starting queries to process using any appropriate technique. For example, if a count of starting queries was determined in step 415, then the number of processed queries may be compared to the count of starting queries from step 415. If there are more starting queries to be processed, then step 420 is performed.

If there are no more starting queries to be processed, then in step 460 the query processing unit 110 establishes, as a preferred query, the global-best query, which has the best cost out of all of the local-best queries for all of the processed starting queries. That is, multiple starting queries may be processed in multiple sets of iterations of steps 420-445 and, thereby, multiple local-best queries may be established. The cost of each of those local-best queries is compared to the global-best query with the best cost is established as the preferred query. In one embodiment, the cost of the original query is also compared to the costs of the local-best queries. If the cost of the original query is better than the costs of any of the local-best queries, then the original query may be established as the preferred query.

In step 490, a request to execute the original query is handled by executing the preferred query. Example embodiments of handling a request to execute the original query by executing the preferred query are described above with respect to step 291.

The techniques described with respect to FIG. 4 are described as including particular steps and a particular sequence of steps. The techniques described herein are in no way limited to those particular steps or to that particular sequence of steps. For example, step 460 may not be performed and, in step 391, the query processing unit 110 responds to a request to execute the original query by executing the local query with the best cost. As another example, if a count of candidate queries tested throughout all of the iterations is kept and compared to a limit, "C", for the total number of candidate queries to be tested, then the iterative technique could be terminated when the number of candidate queries reached the limit "C." As such, the iterative technique may run in constant time O(C). Depending on the value of "C" and implementation, the iterative technique may be more or less expensive than the linear technique.

Various embodiments described with respect to FIG. 2, FIG. 3, and FIG. 4 enable determination of potentially lower cost semantically equivalent versions of a query. Each of the techniques is different and may provide its own potential benefit. For example, the exhaustive candidate selection technique may provide the lowest cost semantically equivalent query, but the technique itself may cost more to perform, computationally, than the other two techniques. Depending on implementation, the exhaustive candidate selection technique may have $O(2^{}N)$ or higher cost, where N is the number of inner query blocks and $X^{}Y$ is X to the power Y. The linear candidate selection technique may provide a lower cost semantically equivalent query in linear computational time, O(N), depending on implementation, thereby saving some computation and real-world time over the exhaustive technique while still providing a semantically equivalent query that has at least as low a cost as the original query. The iterative technique may also provide lower cost, semantically equivalent results.

There may be particular circumstances when it would be beneficial to use each of the different candidate selection techniques. For example, if it is known that a query will be executed many times, then it may be beneficial to use the exhaustive technique in order to determine (and store for later execution) the lowest cost semantically equivalent query. If a relatively simple query is only going to be executed once, then it may be beneficial to perform a linear candidate selection or a relatively limited iterative candidate selection based on the original query. Since any of the candidate selection techniques may be beneficial for a given situation, user, query, or database, it may be useful to provide techniques for providing choices among the alternative candidate selection techniques. Techniques for providing a choice among candidate selection techniques are described below.

Selecting a Technique

Figure 5:
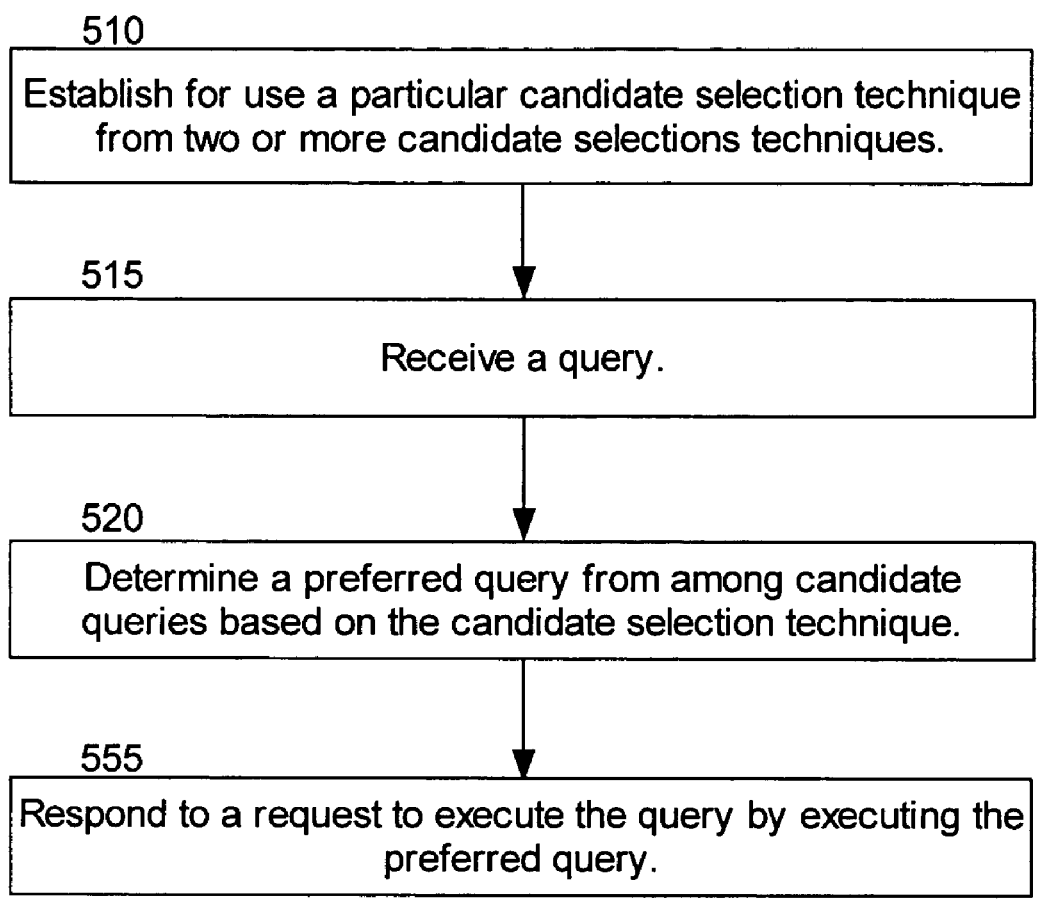
FIG. 5 is a block diagram that depicts a technique for selecting candidate queries using a chosen candidate selection technique.

FIG. 5 is a block diagram that depicts a technique for selecting candidate queries using a chosen candidate selection technique.

In step 510, the query processing unit 110 chooses a particular candidate selection technique from among a set of two or more candidate selection techniques. The choice of candidate selection technique may be based on any appropriate information. For example, if the query processing unit 110 is part of a database server that has a user configuration file, then the query processing unit may access that user configuration file in order to determine the preferred candidate selection technique. Alternatively the query processing unit 110 may make a determination, based on the query and one or more heuristics or whether it is likely that more than one request to execute the query will be received. The query processing unit may also make a determination as to which candidate selection technique to use based on the relative cost of performing the candidate selection technique as compared to the expected or estimated improvement in the cost of generating results for the query. In another embodiment, the query processing unit 110 may make the determination of which candidate selection technique to use based on a flag or other information contained in the query itself.

In step 515, the query processing unit 110 receives the query. In some cases, such as the case here, a determination of candidate selection techniques is made based on a configuration file, step 510 may be performed after step 515. Various embodiments of receiving a query are described above with respect to steps 215, 315, and 415.

In step 520, the query processing unit 110 determines a preferred query from among a set of candidate queries based on the candidate selection technique. Various embodiments of determining a preferred query from among a set of candidate queries based on the candidate selection technique are described above, in general, with respect to FIG. 2, FIG. 3, and FIG. 4.

In step 555, the query processing unit 110 responds to a request to execute the query by executing the preferred query. Various embodiments of responding to a request to execute the query by executing the preferred query are described above with respect to steps 291, 391, and 490 and, in general, with respect to FIG. 2, FIG. 3, and FIG. 4.

Various embodiments of the techniques described with respect to FIG. 5 enable the selection of a candidate selection technique based on user input, based on the query, or based on any appropriate information. Enabling the choice of candidate selection techniques enables the application of different candidate selection techniques based on user specification, particular aspects of the query or the database, or any appropriate information.

Hardware Overview

Figure 6:
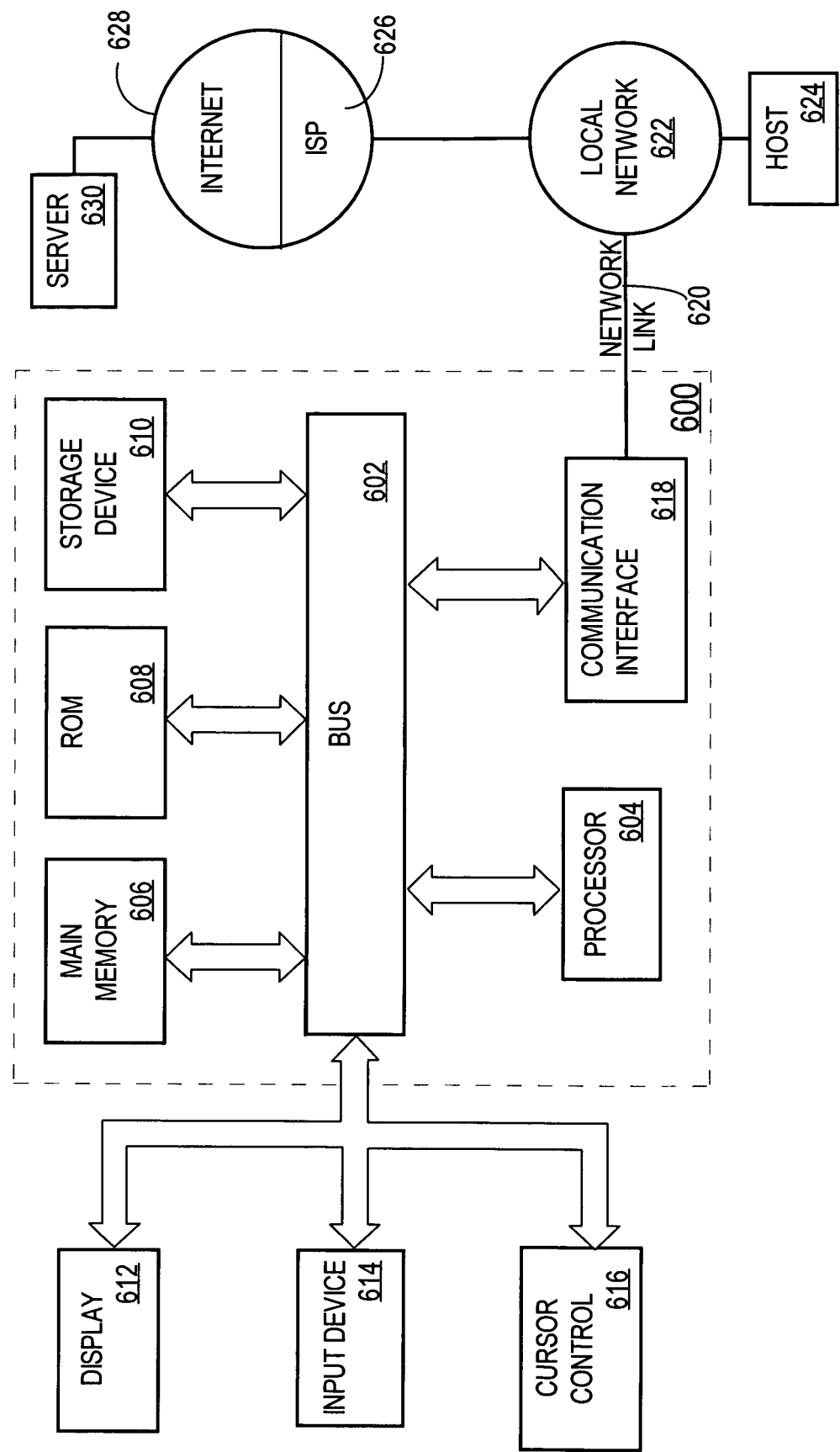
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of processing a query, comprising:
   determining a set of candidate queries for the query based on a particular candidate identification technique;
   wherein the particular candidate identification technique identifies as candidate queries fewer than all semantically equivalent queries that are determinable from transformations of one or more query blocks in the query;
   determining costs for each candidate query of the set of candidate queries;
   choosing a particular query, from the set of candidate queries, based on costs for each query in the set of candidate queries;
   wherein each candidate query in the set of candidate queries is semantically equivalent to the query; and
   executing the particular query in response to a request to execute the query;
   wherein the method is performed by one or more computing devices.

2. The method of claim 1, further comprising determining to use the particular candidate identification technique to process the query at least in part by reading an indication that indicates which candidate identification technique, of two or more candidate identification techniques available to a query-processing unit, to use to process the query.

3. The method of claim 2, wherein the step of reading the indication comprises obtaining the indication from a configuration file.

4. The method of claim 2, wherein the step of reading the indication comprises receiving the indication from a user.

5. The method of claim 1, wherein determining the set of candidate queries comprises determining a particular semantically equivalent query, and wherein determining costs comprises:
   determining a current-best cost based on a first cost for the query and costs for zero or more semantically equivalent queries;
   determining a partial cost for a first portion of the particular semantically equivalent query; and
   if the partial cost satisfies a first particular mathematical relationship with the current-best cost, determining a second cost based on the entire particular semantically equivalent query.

6. The method of claim 5, wherein choosing the particular query comprises, if the partial cost does not satisfy the first particular mathematical relationship with the current-best cost or if the second cost satisfies a second particular mathematical relationship with the current-best cost, then choosing as the particular query a candidate query other than the particular semantically equivalent query.

7. The method of claim 6, wherein the second particular mathematical relationship is "greater than".

8. The method of claim 5, wherein choosing the particular query comprises, if the second cost does not satisfy a second particular mathematical relationship with the current-best cost, then choosing as the particular query a candidate query other than the particular semantically equivalent query.

9. The method of claim 5, wherein the first particular mathematical relationship is "less than".

10. The method of claim 1, further comprising determining the particular candidate identification technique from two or more candidate identification techniques that are available to a query-processing unit to process the query, wherein the two or more candidate identification techniques include an exhaustive query-processing technique that determines an initial set of candidate queries as all semantically equivalent queries that can be generated by the query-processing unit; and defines the set of candidate queries as all queries in the initial set of candidate queries; and chooses for the particular query a certain query that has a best cost of all queries in the initial set of candidate queries.

11. The method of claim 1, wherein the particular candidate identification technique is a linear query-processing technique that determines a starting query based on the query and one or more heuristics, establishes the starting query as a current-best query, and then for each query block in the starting query, determines an alternate state for the query block, and determines a current query based on the current-best query and the alternate state for the query block; wherein choosing the particular query comprises, if a current cost for the current query is better than a current-best cost for the current-best query, then establishing the current query as the current-best query, and choosing the particular query based on the current-best query.

12. The method of claim 1, wherein the particular candidate identification technique is an iterative query-processing technique that determines one or more starting queries based on the query and one or more heuristics, and for each starting query, establishes the starting query as a local-best query, and then for each query block in the starting query, determines an alternate state for the query block, and determines a current query based on the local-best query and the alternate state for the query block; wherein choosing the particular query comprises, if a current cost for the current query is better than a local-best cost for the local-best query, then establishing the current query as the local-best query, and choosing the particular query based on the local-best queries for each starting query.

13. The method of claim 1, further comprising determining the particular candidate identification technique from two or more candidate identification techniques that are available to a query-processing unit to process the query, wherein the two or more candidate identification techniques include two or more of:
   an exhaustive query-processing technique that determines an initial set of candidate queries as all semantically equivalent queries that can be generated by the query-processing unit; defines the set of candidate queries as all queries in the initial set of candidate queries; and chooses for the particular query a certain query that has a best cost of all queries in the initial set of candidate queries;
   a linear query-processing technique that determines a starting query based on the query and one or more heuristics, establishes the starting query as a current-best query, and then for each query block in the starting query, determines an alternate state for the query block, and determines a current query based on the current-best query and the alternate state for the query block; wherein choosing the particular query comprises, if a current cost for the current query is better than a current-best cost for the current-best query, then establishing the current query as the current-best query, and choosing the particular query based on the current-best query; and an iterative query-processing technique that determines one or more starting queries based on the query and one or more heuristics, and for each starting query, establishes the starting query as a local-best query, and then for each query block in the starting query, determines an alternate state for the query block, and determines a current query based on the local-best query and the alternate state for the query block; wherein choosing the particular query comprises, if a current cost for the current query is better than a local-best cost for the local-best query, then establishing the current query as the local-best query, and choosing the particular query based on the local-best queries for each starting query.

14. The method of claim 1, further comprising:
prior to determining the set of candidate queries for the query, determining the particular candidate identification technique from two or more candidate identification techniques that are available to a query-processing unit to process the query;
wherein each candidate identification technique, of the two or more candidate identification techniques, is a technique for identifying which semantically equivalent queries belong to a particular set of candidate queries.

15. A computer-implemented method of processing a query, comprising:
receiving the query, wherein the query comprises one or more query blocks;
determining a set of candidate queries and costs, wherein the costs include a cost for each candidate query in the set of candidate queries, wherein each candidate query in the set of candidate queries corresponds to a combination of possible alternative states for the one or more query blocks in the query, and wherein the set of candidate queries comprises all possible combinations of alternative states for the one or more query blocks;
wherein each candidate query in the set of candidate queries is semantically equivalent to the query;
choosing a particular query from the set of candidate queries based on the costs; and
executing the particular query in response to a request to execute the query;
wherein the method is performed by one or more computing devices.

16. The method of claim 15, wherein determining the set of candidate queries comprises:
generating a copy of the query in memory for each semantically equivalent query in the set of candidate queries; and
processing the copy of the query in memory in order to produce the semantically equivalent query.

17. The method of claim 15, wherein choosing the particular query based on the costs comprises choosing a given query from the set of candidate queries that has a best cost.

18. The method of claim 15, wherein determining the set of candidate queries and costs comprises:
initially establishing the query as a current-best query;
determining a current-best cost based on the current-best query;
for each certain query of the set of candidate queries:
determining a current cost based on the certain query;
if the current cost satisfies a first particular mathematical relationship with the current-best cost, then:
establishing the certain query as the current-best query; and
establishing the current cost as the current-best cost.

19. The method of claim 18, wherein determining the set of candidate queries and costs further comprises:
determining a partial cost for a first portion of the certain query; and
if the partial cost satisfies the first particular mathematical relationship with the current-best cost, determining a second cost based on the entire particular semantically equivalent query.

20. The method of claim 19, wherein choosing the particular query comprises, if the partial cost does not satisfy the first particular mathematical relationship with the current-best cost or if the second cost satisfies a second particular mathematical relationship with the current-best cost, then choosing as the particular query a candidate query other than the certain query.

21. The method of claim 20, wherein the second particular mathematical relationship is "greater than".

22. The method of claim 19, wherein choosing the particular query comprises, if the second cost does not satisfy a second particular mathematical relationship with the current-best cost, then choosing as the particular query a candidate query other than the certain query.

23. The method of claim 18, wherein the first particular mathematical relationship is "less than".

24. The method of claim 15, wherein the query has one or more query blocks and wherein determining the set of candidate queries and costs comprises determining a particular semantically equivalent query based on the query and an alternative query block, wherein the alternative query block is determined based on a first query block of the one or more query blocks.

25. The method of claim 24, wherein the method further comprises the step of determining the alternative query block based on the first query block.

26. The method of claim 25, wherein the first query block is a first subquery and wherein the step of determining the alternative query block comprises:
unnesting the first subquery; and
determining the alternative query block based on the unnesting step.

27. The method of claim 25, wherein the first query block is a first subquery and wherein the step of determining the alternative query block comprises:
unnesting the first subquery;
determining an interim query block based on the unnesting step, wherein the interim query block comprises a mergeable view;
merging the mergeable view; and
determining the alternative query block based on the merging step.

28. The method of claim 25, wherein the first query block is an inline view and wherein the step of determining the alternative query block comprises:
merging the inline view into the query.

29. The method of claim 25, wherein the query contains a predicate, and the first query block is an inline view; and wherein the step of determining the alternative query block comprises:
pushing the predicate into the inline view.

30. A computer-implemented method of processing a query, comprising:
receiving the query, wherein the query comprises one or more query blocks;
establishing a current-best query based on the query;
determining a set of candidate queries and costs, wherein the costs include a cost corresponding to each candidate query in the set of candidate queries, wherein each candidate query in the set of candidate queries is determined based on the current-best query and an alternative state of a particular query block of the one or more query blocks, wherein if a specific cost associated with a specific candidate query satisfies a first particular mathematical relationship with a current-best cost for the current-best query, then the specific candidate query is established as the current-best query;
wherein each candidate query in the set of candidate queries is semantically equivalent to the query;
choosing a particular query from the set of candidate queries based on the costs for the candidate queries in the set of candidate queries; and
executing the particular query in response to a request to execute the query;
wherein the method is performed by one or more computing devices.

31. The method of claim 30, wherein determining the set of candidate queries comprises:
generating a copy of the query in memory for each semantically equivalent query in the set of candidate queries; and
processing the copy of the query in memory in order to produce the semantically equivalent query.

32. The method of claim 30, wherein determining the set of candidate queries and costs comprises:
for each query block of a set of one or more particular query blocks of the one or more query blocks:
determining a candidate query in the set of candidate queries based on the current-best query and a particular alternative state of the query block;
determining a first cost for the candidate query;
if the first cost satisfies the first particular mathematical relationship with the current-best cost, then establishing the candidate query as the current-best query.

33. The method of claim 30, wherein the step of choosing the particular query comprises:
if a cost for the query satisfies a second particular mathematical relationship with the current-best cost, then establishing as the particular query the current-best query; and
if the cost for the query does not satisfy the second particular mathematical relationship with the current-best cost, then establishing the query as the particular query.

34. The method of claim 33, wherein the second particular mathematical relationship is "greater than".

35. The method of claim 30, wherein the set of candidate queries comprises a certain query, and wherein determining costs comprises:
determining a partial cost for a first portion of the certain query; and
if the partial cost satisfies the first particular mathematical relationship with the current-best cost, determining a second cost based on the entire certain query.

36. The method of claim 35, wherein choosing the particular query comprises, if the partial cost does not satisfy the first particular mathematical relationship with the current-best cost or if the second cost satisfies a second particular mathematical relationship with the current-best cost, then choosing as the particular query a candidate query other than the certain query.

37. The method of claim 35, wherein choosing the particular query comprises, if the second cost does not satisfy a second particular mathematical relationship with the current-best cost, then choosing as the particular query a candidate query other than the certain query.

38. The method of claim 30, wherein the first particular mathematical relationship is "less than".

39. The method of claim 30, wherein the query has one or more query blocks and wherein determining the set of candidate queries comprises determining a particular semantically equivalent query based on the query and an alternative query block, wherein the alternative query block is determined based on a first query block of the one or more query blocks.

40. The method of claim 39, wherein the method further comprises the step of determining the alternative query block based on the first query block.

41. The method of claim 40, wherein the first query block is a first subquery and wherein the step of determining the alternative query block comprises:
unnesting the first subquery; and
determining the alternative query block based on the unnesting step.

42. The method of claim 40, wherein the first query block is a first subquery and wherein the step of determining the alternative query block comprises:
unnesting the first subquery;
determining an interim query block based on the unnesting step, wherein the interim query block comprises a mergeable view;
merging the mergeable view; and
determining the alternative query block based on the merging step.

43. The method of claim 40, wherein the first query block is an inline view and wherein the step of determining the alternative query block comprises:
merging the inline view into the query.

44. The method of claim 40, wherein the query contains a predicate, and the first query block is an inline view; and wherein the step of determining the alternative query block comprises:
pushing the predicate into the inline view.

45. The method of claim 30, wherein establishing the current-best query comprises:
determining a starting query based on the query and one or more heuristics; and
establishing the starting query as the current-best query.

46. A computer-implemented method of processing a query, comprising:
receiving the query, wherein the query comprises one or more query blocks;
determining multiple starting queries based on the query and one or more heuristics;
for each starting query of the multiple starting queries:
establishing said each starting query as a local-best query;
determining a set of candidate queries and costs, wherein the costs include a cost for each candidate query in the set of candidate queries, wherein each candidate query in the set of candidate queries is determined based on the local-best query and an alternative state for a particular query block of the one or more query blocks, and wherein, if a specific cost for a specific candidate query satisfies a first particular mathematical relationship with a local-best cost for the local-best query, then establishing the specific candidate query as the local-best query;

wherein each candidate query in the set of candidate queries is semantically equivalent to the query;

choosing a particular query from a set of local-best queries based on costs for each query in the set of local-best queries, wherein the set of local-best queries comprises the local-best query for each set of candidate queries; and executing the particular query in response to a request to execute the query;

wherein the method is performed by one or more computing devices.

47. The method of claim 46, wherein determining the set of candidate queries comprises:

generating a copy of the query in memory for each semantically equivalent query in the set of candidate queries; and processing the copy of the query in memory in order to produce the semantically equivalent query.

48. The method of claim 46, wherein the step of choosing the particular query from the set of local-best queries comprises:

establishing, as a global-best query, the local-best query for a first starting query of the multiple starting queries;

after determining each local-best query for each starting query, determining whether the local-best cost for the local-best query is better than a global-best cost for the global-best query; and if the local-best cost is better than the global-best cost, then establishing the local-best cost as the global-best cost; and establishing the local-best query as the global-best query.

49. The method of claim 46, wherein the step of determining the candidate queries comprises determining the particular query block based on costs for the one or more query blocks.

50. The method of claim 46, wherein the method further comprises:

for each starting query of the multiple starting queries, determining the local-best cost based on the local-best query; and wherein determining the set of candidate queries and costs comprises:

for each query block of one or more particular query blocks of the one or more query blocks in the starting query:

determining a particular alternative state of the query block;

determining a current query based on the local-best query and the particular alternative state of the query block;

determining a current cost based on the current query;

if the current cost satisfies the first particular mathematical relationship with the local-best cost, then:

establishing the current query as the local-best query; and establishing the current cost as the local-best cost.

51. The method of claim 46, wherein a particular set of candidate queries from among the sets of candidate queries comprises a certain query, and wherein determining the particular set of candidate queries and costs comprises:

determining a partial cost for a first portion of the certain query; and if the partial cost satisfies the first particular mathematical relationship with the local-best cost, determining a third cost based on the entire certain query.

52. The method of claim 51, wherein choosing the particular query comprises, if the partial cost does not satisfy the first particular mathematical relationship with the local-best cost or if the third cost satisfies a second particular mathematical relationship with the local-best cost, then choosing as the particular query a candidate query other than the certain query.

53. The method of claim 52, wherein the second particular mathematical relationship is "greater than".

54. The method of claim 51, wherein choosing the particular query comprises, if the third cost does not satisfy a second particular mathematical relationship with the local-best cost, then choosing as the particular query a candidate query other than the certain query.

55. The method of claim 46, wherein the first particular mathematical relationship is "less than".

56. The method of claim 46, wherein the query has one or more query blocks and wherein determining the set of candidate queries for each starting query comprises determining a particular semantically equivalent query based on the starting query and an alternative query block, wherein the alternative query block is determined based on a first query block of the one or more query blocks.

57. The method of claim 56, wherein the method further comprises the step of determining the alternative query block based on the first query block.

58. The method of claim 57, wherein the first query block is a first subquery and wherein the step of determining the alternative query block comprises:

unnesting the first subquery; and determining the alternative query block based on the unnesting step.

59. The method of claim 57, wherein the first query block is a first subquery and wherein the step of determining the alternative query block comprises:

unnesting the first subquery;

determining an interim query block based on the unnesting step, wherein the interim query block comprises a mergeable view;

merging the mergeable view; and determining the alternative query block based on the merging step.

60. The method of claim 57, wherein the first query block is an inline view and wherein the step of determining the alternative query block comprises:

merging the inline view into the query.

61. The method of claim 57, wherein the query contains a predicate, and the first query block is an inline view; and wherein the step of determining the alternative query block comprises:

pushing the predicate into the inline view.

62. The method of claim 46, wherein the step of determining the set of candidate queries for each starting query comprises executing one or more particular computer-executable instructions, and wherein the method further comprises terminating the step of determining the set of candidate queries for each starting query after executing the one or more particular computer-executable instructions a defined number of times.

63. The method of claim 62, further comprising determining the defined number of times based on input from a user.

64. A machine-readable storage medium storing one or more sequences of instructions for processing a query, which instructions, when executed by one or more processors, cause the one or more processors to perform steps comprising:
- determining a set of candidate queries for the query based on a particular candidate identification technique;
- wherein the particular candidate identification technique identifies as candidate queries fewer than all semantically equivalent queries that are determinable from transformations of one or more query blocks in the query;
- determining costs for each candidate query of the set of candidate queries;
- choosing a particular query, from the set of candidate queries, based on costs for each query in the set of candidate queries;
- wherein each candidate query in the set of candidate queries is semantically equivalent to the query; and
- executing the particular query in response to a request to execute the query.

65. The machine-readable storage medium of claim 64, wherein the one or more sequences of instructions further comprise instructions which, when executed by the one or more processors, cause the one or more processors to perform the step of determining to use the particular candidate identification technique to process the query at least in part by reading an indication that indicates which candidate identification technique, of two or more candidate identification techniques available to a query-processing unit, to use to process the query.

66. The machine-readable storage medium of claim 65, wherein the instructions that cause reading the indication comprise instructions which, when executed by the one or more processors, cause the one or more processors to perform the step of obtaining the indication from a configuration file.

67. The machine-readable storage medium of claim 65, wherein the instructions that cause reading the indication comprise instructions which, when executed by the one or more processors, cause the one or more processors to perform the step of receiving the indication from a user.

68. The machine-readable storage medium of claim 64, wherein the instructions that cause determining the set of candidate queries comprise instructions which, when executed by the one or more processors, cause the one or more processors to perform the step of determining a particular semantically equivalent query, and wherein the instructions that cause determining costs comprise instructions which, when executed by the one or more processors, cause the one or more processors to perform the steps of:
- determining a current-best cost based on a first cost for the query and costs for zero or more semantically equivalent queries;
- determining a partial cost for a first portion of the particular semantically equivalent query; and
- if the partial cost satisfies a first particular mathematical relationship with the current-best cost, determining a second cost based on the entire particular semantically equivalent query.

69. The machine-readable storage medium of claim 68, wherein the instructions that cause choosing the particular query comprise instructions which, when executed by the one or more processors, cause the one or more processors to perform the step of, if the partial cost does not satisfy the first particular mathematical relationship with the current-best cost or if the second cost satisfies a second particular mathematical relationship with the current-best cost, then choosing as the particular query a candidate query other than the particular semantically equivalent query.

70. The machine-readable storage medium of claim 68, wherein the instructions that cause choosing the particular query comprise instructions which, when executed by the one or more processors, cause the one or more processors to perform the step of, if the second cost does not satisfy a second particular mathematical relationship with the current-best cost, then choosing as the particular query a candidate query other than the particular semantically equivalent query.

71. The machine-readable storage medium of claim 68, wherein the first particular mathematical relationship is "less than".

72. The machine-readable storage medium of claim 69, wherein the second particular mathematical relationship is "greater than".

73. The machine-readable storage medium of claim 64, wherein the one or more sequences of instructions further comprise instructions which, when executed by the one or more processors, cause the one or more processors to perform the step of determining the particular candidate identification technique from two or more candidate identification techniques that are available to a query-processing unit to process the query, wherein the two or more candidate identification techniques include an exhaustive query-processing technique that determines an initial set of candidate queries as all semantically equivalent queries that can be generated by the query-processing unit; and defines the set of candidate queries as all queries in the initial set of candidate queries; and chooses for the particular query a certain query that has a best cost of all queries in the initial set of candidate queries.

74. The machine-readable storage medium of claim 64, wherein the particular candidate identification technique is a linear query-processing technique that determines a starting query based on the query and one or more heuristics, establishes the starting query as a current-best query, and then for each query block in the starting query, determines an alternate state for the query block, and determines a current query based on the current-best query and the alternate state for the query block; wherein the instructions that cause choosing the particular query comprise instructions which, when executed by the one or more processors, cause the one or more processors to perform the steps of, if a current cost for the current query is better than a current-best cost for the current-best query, then establishing the current query as the current-best query, and choosing the particular query based on the current-best query.

75. The machine-readable storage medium of claim 64, wherein the particular candidate identification technique is an iterative query-processing technique that determines one or more starting queries based on the query and one or more heuristics, and for each starting query, establishes the starting query as a local-best query, and then for each query block in the starting query, determines an alternate state for the query block, and determines a current query based on the local-best query and the alternate state for the query block; wherein the instructions that cause choosing the particular query comprise instructions which, when executed by the one or more processors, cause the one or more processors to perform the steps of, if a current cost for the current query is better than a local-best cost for the local-best query, then establishing the current query as the local-best query, and choosing the particular query based on the local-best queries for each starting query.

76. The machine-readable storage medium of claim 64, wherein the one or more sequences of instructions further comprise instructions which, when executed by the one or more processors, cause the one or more processors to perform the step of determining the particular candidate identification technique from two or more candidate identification techniques that are available to a query-processing unit to process the query, wherein the two or more candidate identification techniques include two or more of:

an exhaustive query-processing technique that determines an initial set of candidate queries as all semantically equivalent queries that can be generated by the query-processing unit; defines the set of candidate queries as all queries in the initial set of candidate queries; and chooses for the particular query a certain query that has a best cost of all queries in the initial set of candidate queries;

a linear query-processing technique that determines a starting query based on the query and one or more heuristics, establishes the starting query as a current-best query, and then for each query block in the starting query, determines an alternate state for the query block, and determines a current query based on the current-best query and the alternate state for the query block; wherein the instructions that cause choosing the particular query comprise instructions which, when executed by the one or more processors, cause the one or more processors to perform the steps of, if a current cost for the current query is better than a current-best cost for the current-best query, then establishing the current query as the current-best query, and choosing the particular query based on the current-best query; and an iterative query-processing technique that determines one or more starting queries based on the query and one or more heuristics, and for each starting query, establishes the starting query as a local-best query, and then for each query block in the starting query, determines an alternate state for the query block, and determines a current query based on the local-best query and the alternate state for the query block; wherein the instructions that cause choosing the particular query comprise instructions which, when executed by the one or more processors, cause the one or more processors to perform the step of, if a current cost for the current query is better than a local-best cost for the local-best query, then establishing the current query as the local-best query, and choosing the particular query based on the local-best queries for each starting query.

77. A machine-readable storage medium storing one or more sequences of instructions for processing a query, which instructions, when executed by one or more processors, cause the one or more processors to perform steps comprising:

receiving the query, wherein the query comprises one or more query blocks;

determining a set of candidate queries and costs, wherein the costs include a cost for each candidate query in the set of candidate queries, wherein each candidate query in the set of candidate queries corresponds to a combination of possible alternative states for the one or more query blocks in the query, and wherein the set of candidate queries comprises all possible combinations of alternative states for the one or more query blocks;

wherein each candidate query in the set of candidate queries is semantically equivalent to the query;

choosing a particular query from the set of candidate queries based on the costs; and executing the particular query in response to a request to execute the query.

78. The machine-readable storage medium of claim 77, wherein the instructions that cause determining the set of candidate queries comprise instructions which, when executed by the one or more processors, cause the one or more processors to perform the steps of:

generating a copy of the query in memory for each semantically equivalent query in the set of candidate queries; and processing the copy of the query in memory in order to produce the semantically equivalent query.

79. The machine-readable storage medium of claim 77, wherein the instructions that cause choosing the particular query based on the costs comprise instructions which, when executed by the one or more processors, cause the one or more processors to perform the step of choosing a given query from the set of candidate queries that has a best cost.

80. The machine-readable storage medium of claim 77, wherein the instructions that cause determining the set of candidate queries and costs comprise instructions which, when executed by the one or more processors, cause the one or more processors to perform the steps of:

initially establishing the query as a current-best query;

determining a current-best cost based on the current-best query;

for each certain query of the set of candidate queries:
determining a current cost based on the certain query;
if the current cost satisfies a first particular mathematical relationship with the current-best cost, then:
establishing the certain query as the current-best query; and
establishing the current cost as the current-best cost.

81. The machine-readable storage medium of claim 80, wherein the instructions that cause determining the set of candidate queries and costs further comprise instructions which, when executed by the one or more processors, cause the one or more processors to perform the steps of:

determining a partial cost for a first portion of the certain query; and if the partial cost satisfies the first particular mathematical relationship with the current-best cost, determining a second cost based on the entire particular semantically equivalent query.

82. The machine-readable storage medium of claim 81, wherein the instructions that cause choosing the particular query comprise instructions which, when executed by the one or more processors, cause the one or more processors to perform the step of, if the partial cost does not satisfy the first particular mathematical relationship with the current-best cost or if the second cost satisfies a second particular mathematical relationship with the current-best cost, then choosing as the particular query a candidate query other than the certain query.

83. The machine-readable storage medium of claim 82, wherein the second particular mathematical relationship is "greater than".

84. The machine-readable storage medium of claim 81, wherein the instructions that cause choosing the particular query comprise instructions which, when executed by the one or more processors, cause the one or more processors to perform the step of, if the second cost does not satisfy a second particular mathematical relationship with the current-best cost, then choosing as the particular query a candidate query other than the certain query.

85. The machine-readable storage medium of claim 80, wherein the first particular mathematical relationship is "less than".

86. The machine-readable storage medium of claim 77, wherein the query has one or more query blocks and wherein the instructions that cause determining the set of candidate queries and costs comprise instructions which, when executed by the one or more processors, cause the one or more processors to perform the step of determining a particular semantically equivalent query based on the query and an alternative query block, wherein the alternative query block is determined based on a first query block of the one or more query blocks.

87. The machine-readable storage medium of claim 86, wherein the one or more sequences of instructions further comprise instructions which, when executed by the one or more processors, cause the one or more processors to perform the step of determining the alternative query block based on the first query block.

88. The machine-readable storage medium of claim 87, wherein the first query block is a first subquery and wherein the instructions that cause determining the alternative query block comprise instructions which, when executed by the one or more processors, cause the one or more processors to perform the steps of:
    unnesting the first subquery; and
    determining the alternative query block based on the unnesting step.

89. The machine-readable storage medium of claim 87, wherein the first query block is a first subquery and wherein the instructions that cause determining the alternative query block comprise instructions which, when executed by the one or more processors, cause the one or more processors to perform the steps of:
    unnesting the first subquery;
    determining an interim query block based on the unnesting step, wherein the interim query block comprises a mergeable view;
    merging the mergeable view; and
    determining the alternative query block based on the merging step.

90. The machine-readable storage medium of claim 87, wherein the first query block is an inline view and wherein the instructions that cause determining the alternative query block comprise instructions which, when executed by the one or more processors, cause the one or more processors to perform the step of:
    merging the inline view into the query.

91. The machine-readable storage medium of claim 87, wherein the query contains a predicate, and the first query block is an inline view; and wherein the instructions that cause determining the alternative query block comprise instructions which, when executed by the one or more processors, cause the one or more processors to perform the step of:
    pushing the predicate into the inline view.

92. A machine-readable storage medium storing one or more sequences of instructions for processing a query, which instructions, when executed by one or more processors, cause the one or more processors to perform steps comprising:
    receiving the query, wherein the query comprises one or more query blocks;
    establishing a current-best query based on the query;
    determining a set of candidate queries and costs, wherein the costs include a cost corresponding to each candidate query in the set of candidate queries, wherein each candidate query in the set of candidate queries is determined based on the current-best query and an alternative state of a particular query block of the one or more query blocks, wherein if a specific cost associated with a specific candidate query satisfies a first particular mathematical relationship with a current-best cost for the current-best query, then the specific candidate query is established as the current-best query;
    wherein each candidate query in the set of candidate queries is semantically equivalent to the query;
    choosing a particular query from the set of candidate queries based on the costs for the candidate queries in the set of candidate queries; and
    executing the particular query in response to a request to execute the query.

93. The machine-readable storage medium of claim 92, wherein the instructions that cause determining the set of candidate queries comprise instructions which, when executed by the one or more processors, cause the one or more processors to perform the steps of:
    generating a copy of the query in memory for each semantically equivalent query in the set of candidate queries; and
    processing the copy of the query in memory in order to produce the semantically equivalent query.

94. The machine-readable storage medium of claim 92, wherein the instructions that cause determining the set of candidate queries and costs comprise instructions which, when executed by the one or more processors, cause the one or more processors to perform the steps of:
    for each query block of a set of one or more particular query blocks of the one or more query blocks:
        determining a candidate query in the set of candidate queries based on the current-best query and a particular alternative state of the query block;
        determining a first cost for the candidate query;
        if the first cost satisfies the first particular mathematical relationship with the current-best cost, then establishing the candidate query as the current-best query.

95. The machine-readable storage medium of claim 92, wherein the instructions that cause choosing the particular query comprise instructions which, when executed by the one or more processors, cause the one or more processors to perform the steps of:
    if a cost for the query satisfies a second particular mathematical relationship with the current-best cost, then establishing as the particular query the current-best query; and
    if the cost for the query does not satisfy the second particular mathematical relationship with the current-best cost, then establishing the query as the particular query.

96. The machine-readable storage medium of claim 95, wherein the second particular mathematical relationship is "greater than".

97. The machine-readable storage medium of claim 92, wherein the set of candidate queries comprises a certain query, and wherein the instructions that cause determining costs comprise instructions which, when executed by the one or more processors, cause the one or more processors to perform the steps of:
    determining a partial cost for a first portion of the certain query; and
    if the partial cost satisfies the first particular mathematical relationship with the current-best cost, determining a second cost based on the entire certain query.

98. The machine-readable storage medium of claim 97, wherein the instructions that cause choosing the particular query comprise instructions which, when executed by the one or more processors, cause the one or more processors to perform the step of, if the partial cost does not satisfy the first particular mathematical relationship with the current-best cost or if the second cost satisfies a second particular mathematical relationship with the current-best cost, then choosing as the particular query a candidate query other than the certain query.

99. The machine-readable storage medium of claim 97, wherein the instructions that cause choosing the particular query comprise instructions which, when executed by the one or more processors, cause the one or more processors to perform the step of, if the second cost does not satisfy a second particular mathematical relationship with the current-best cost, then choosing as the particular query a candidate query other than the certain query.

100. The machine-readable storage medium of claim 92, wherein the first particular mathematical relationship is "less than".

101. The machine-readable storage medium of claim 92, wherein the query has one or more query blocks and wherein the instructions that cause determining the set of candidate queries comprise instructions which, when executed by the one or more processors, cause the one or more processors to perform the step of determining a particular semantically equivalent query based on the query and an alternative query block, wherein the alternative query block is determined based on a first query block of the one or more query blocks.

102. The machine-readable storage medium of claim 101, wherein the one or more sequences of instructions further comprise instructions which, when executed by the one or more processors, cause the one or more processors to perform the step of determining the alternative query block based on the first query block.

103. The machine-readable storage medium of claim 102, wherein the first query block is a first subquery and wherein the instructions that cause determining the alternative query block comprise instructions which, when executed by the one or more processors, cause the one or more processors to perform the steps of:
    unnesting the first subquery; and
    determining the alternative query block based on the unnesting step.

104. The machine-readable storage medium of claim 102, wherein the first query block is a first subquery and wherein the instructions that cause determining the alternative query block comprise instructions which, when executed by the one or more processors, cause the one or more processors to perform the steps of:
    unnesting the first subquery;
    determining an interim query block based on the unnesting step, wherein the interim query block comprises a mergeable view;
    merging the mergeable view; and
    determining the alternative query block based on the merging step.

105. The machine-readable storage medium of claim 102, wherein the first query block is an inline view and wherein the instructions that cause determining the alternative query block comprise instructions which, when executed by the one or more processors, cause the one or more processors to perform the step of:
    merging the inline view into the query.

106. The machine-readable storage medium of claim 102, wherein the query contains a predicate, and the first query block is an inline view; and wherein the instructions that cause determining the alternative query block comprise instructions which, when executed by the one or more processors, cause the one or more processors to perform the step of:
    pushing the predicate into the inline view.

107. The machine-readable storage medium of claim 92, wherein the instructions that cause establishing the current-best query comprise instructions which, when executed by the one or more processors, cause the one or more processors to perform the steps of:
    determining a starting query based on the query and one or more heuristics; and
    establishing the starting query as the current-best query.

108. A machine-readable storage medium storing one or more sequences of instructions for processing a query, which instructions, when executed by one or more processors, cause the one or more processors to perform steps comprising:
    receiving the query, wherein the query comprises one or more query blocks;
    determining multiple starting queries based on the query and one or more heuristics;
    for each starting query of the multiple starting queries:
        establishing said each starting query as a local-best query;
        determining a set of candidate queries and costs, wherein the costs include a cost for each candidate query in the set of candidate queries, wherein each candidate query in the set of candidate queries is determined based on the local-best query and an alternative state for a particular query block of the one or more query blocks, and wherein, if a specific cost for a specific candidate query satisfies a first particular mathematical relationship with a local-best cost for the local-best query, then establishing the specific candidate query as the local-best query;
        wherein each candidate query in the set of candidate queries is semantically equivalent to the query;
    choosing a particular query from a set of local-best queries based on costs for each query in the set of local-best queries, wherein the set of local-best queries comprises the local-best query for each set of candidate queries; and
    executing the particular query in response to a request to execute the query.

109. The machine-readable storage medium of claim 108, wherein the instructions that cause determining the set of candidate queries comprise instructions which, when executed by the one or more processors, cause the one or more processors to perform the steps of:
    generating a copy of the query in memory for each semantically equivalent query in the set of candidate queries; and
    processing the copy of the query in memory in order to produce the semantically equivalent query.

110. The machine-readable storage medium of claim 108, wherein the instructions that cause choosing the particular query from the set of local-best queries comprise instructions which, when executed by the one or more processors, cause the one or more processors to perform the steps of:
    establishing, as a global-best query, the local-best query for a first starting query of the multiple starting queries;
    after determining each local-best query for each starting query, determining whether the local-best cost for the local-best query is better than a global-best cost for the global-best query; and
    if the local-best cost is better than the global-best cost, then:
        establishing the local-best cost as the global-best cost; and
        establishing the local-best query as the global-best query.

111. The machine-readable storage medium of claim 108, wherein the instructions that cause determining the candidate queries comprise instructions which, when executed by the one or more processors, cause the one or more processors to perform the step of determining the particular query block based on costs for the one or more query blocks.

112. The machine-readable storage medium of claim 108, wherein the one or more sequences of instructions further comprise instructions which, when executed by the one or more processors, cause the one or more processors to perform the step of:
- for each starting query of the multiple starting queries, determining the local-best cost based on the local-best query; and
- wherein the instructions that cause determining the set of candidate queries and costs comprise instructions which, when executed by the one or more processors, cause the one or more processors to perform the steps of:
  - for each query block of one or more particular query blocks of the one or more query blocks in the starting query:
    - determining a particular alternative state of the query block;
    - determining a current query based on the local-best query and the particular alternative state of the query block;
    - determining a current cost based on the current query;
    - if the current cost satisfies the first particular mathematical relationship with the local-best cost, then:
      - establishing the current query as the local-best query; and
      - establishing the current cost as the local-best cost.

113. The machine-readable storage medium of claim 108, wherein a particular set of candidate queries from among the sets of candidate queries comprises a certain query, and wherein the instructions that cause determining the particular set of candidate queries and costs comprise instructions which, when executed by the one or more processors, cause the one or more processors to perform the steps of:
- determining a partial cost for a first portion of the certain query; and
- if the partial cost satisfies the first particular mathematical relationship with the local-best cost, determining a third cost based on the entire certain query.

114. The machine-readable storage medium of claim 113, wherein the instructions that cause choosing the particular query comprise instructions which, when executed by the one or more processors, cause the one or more processors to perform the step of, if the partial cost does not satisfy the first particular mathematical relationship with the local-best cost or if the third cost satisfies a second particular mathematical relationship with the local-best cost, then choosing as the particular query a candidate query other than the certain query.

115. The machine-readable storage medium of claim 114, wherein the second particular mathematical relationship is "greater than".

116. The machine-readable storage medium of claim 113, wherein the instructions that cause choosing the particular query comprise instructions which, when executed by the one or more processors, cause the one or more processors to perform the step of, if the third cost does not satisfy a second particular mathematical relationship with the local-best cost, then choosing as the particular query a candidate query other than the certain query.

117. The machine-readable storage medium of claim 108, wherein the first particular mathematical relationship is "less than".

118. The machine-readable storage medium of claim 108, wherein the query has one or more query blocks and wherein the instructions that cause determining the set of candidate queries for each starting query comprise instructions which, when executed by the one or more processors, cause the one or more processors to perform the step of determining a particular semantically equivalent query based on the starting query and an alternative query block, wherein the alternative query block is determined based on a first query block of the one or more query blocks.

119. The machine-readable storage medium of claim 118, wherein the one or more sequences of instructions further comprise instructions which, when executed by the one or more processors, cause the one or more processors to perform the step of determining the alternative query block based on the first query block.

120. The machine-readable storage medium of claim 119, wherein the first query block is a first subquery and wherein the instructions that cause determining the alternative query block comprise instructions which, when executed by the one or more processors, cause the one or more processors to perform the steps of:
- unnesting the first subquery; and
- determining the alternative query block based on the unnesting step.

121. The machine-readable storage medium of claim 119, wherein the first query block is a first subquery and wherein the instructions that cause determining the alternative query block comprise instructions which, when executed by the one or more processors, cause the one or more processors to perform the steps of:
- unnesting the first subquery;
- determining an interim query block based on the unnesting step, wherein the interim query block comprises a mergeable view;
- merging the mergeable view; and
- determining the alternative query block based on the merging step.

122. The machine-readable storage medium of claim 119, wherein the first query block is an inline view and wherein the instructions that cause determining the alternative query block comprise instructions which, when executed by the one or more processors, cause the one or more processors to perform the step of:
- merging the inline view into the query.

123. The machine-readable storage medium of claim 119, wherein the query contains a predicate, and the first query block is an inline view; and wherein the instructions that cause determining the alternative query block comprise instructions which, when executed by the one or more processors, cause the one or more processors to perform the step of:
- pushing the predicate into the inline view.

124. The machine-readable storage medium of claim 108, wherein the instructions that cause determining the set of candidate queries for each starting query comprise instructions which, when executed by the one or more processors, cause the one or more processors to perform the step of executing one or more particular computer-executable instructions, and wherein the one or more sequences of instructions further comprise instructions which, when executed by the one or more processors, cause the one or more processors to perform the step of terminating the step of determining the set of candidate queries for each starting query after executing the one or more particular computer-executable instructions a defined number of times.

125. The machine-readable storage medium of claim 124, wherein the one or more sequences of instructions further comprise instructions which, when executed by the one or more processors, cause the one or more processors to perform the step of determining the defined number of times based on input from a user.

126. The machine-readable storage medium of claim 64, wherein the one or more sequences of instructions further comprise instructions which, when executed by the one or more processors, cause the one or more processors to perform the step of:

prior to determining the set of candidate queries for the query, determining the particular candidate identification technique from two or more candidate identification techniques that are available to a query-processing unit to process the query;

wherein each candidate identification technique, of the two or more candidate identification techniques, is a technique for identifying which semantically equivalent queries belong to a particular set of candidate queries.

* * * * *

UNITED STATES PATENT AND TRADEMARK OFFICE
CERTIFICATE OF CORRECTION

PATENT NO.        : 7,814,042 B2
APPLICATION NO.   : 10/920973
DATED             : October 12, 2010
INVENTOR(S)       : Rafi Ahmed Page 1 of 1

It is certified that error appears in the above-identified patent and that said Letters Patent is hereby corrected as shown below:

On the title page, item (57), in column 2, line 9, after "for" delete "an".

In column 10, line 20, delete "10" and insert -- 110 --, therefor.

In column 10, line 33, delete "10" and insert -- 110 --, therefor.

Signed and Sealed this
Thirty-first Day of May, 2011

David J. Kappos
*Director of the United States Patent and Trademark Office*